(12) United States Patent (10) Patent No.: US 7,953,979 B2
Borneman et al. (45) Date of Patent: May 31, 2011

(54) SYSTEMS AND METHODS FOR ENABLING TRUST IN A FEDERATED COLLABORATION

(75) Inventors: Christopher Allen Borneman, Leesburg, VA (US); James Gerard Kobielus, Alexandria, VA (US); Jeffrey Dean Nigriny, Purcellville, VA (US); Robert Edmund Sherwood, Burke, VA (US); Vijay Kumar Takanti, Fairfax, VA (US)

(73) Assignee: Exostar Corporation, Herndon, VA (US)

(*) Notice: Subject to any disclaimer, the term of this patent is extended or adjusted under 35 U.S.C. 154(b) by 993 days.

(21) Appl. No.: 11/302,284

(22) Filed: Dec. 14, 2005

(65) Prior Publication Data

US 2006/0129817 A1 Jun. 15, 2006

Related U.S. Application Data

(60) Provisional application No. 60/635,984, filed on Dec. 15, 2004.

(51) Int. Cl.
*H04L 9/32* (2006.01)
*G06F 21/00* (2006.01)
*G06F 15/16* (2006.01)

(52) U.S. Cl. ............ 713/175; 713/156; 713/176; 726/1; 726/10

(58) Field of Classification Search ................ 726/5, 10; 713/201
See application file for complete search history.

(56) References Cited

U.S. PATENT DOCUMENTS

| 6,304,974 | B1* | 10/2001 | Samar ............................ 726/10 |
| 7,171,441 | B2* | 1/2007 | Shiouchi et al. .............. 709/202 |
| 7,299,493 | B1* | 11/2007 | Burch et al. ....................... 726/5 |
| 7,496,751 | B2* | 2/2009 | de Jong et al. ................. 713/155 |
| 7,565,536 | B2* | 7/2009 | Vassilev et al. ............... 713/168 |
| 7,581,012 | B2* | 8/2009 | Shiouchi et al. .............. 709/229 |
| 2002/0062451 | A1* | 5/2002 | Scheidt et al. ................ 713/201 |
| 2003/0163733 | A1 | 8/2003 | Barriga-Caceres et al. |
| 2003/0229792 | A1* | 12/2003 | Baldwin et al. ............... 713/185 |

(Continued)

FOREIGN PATENT DOCUMENTS

EP 1 089 516 A2 4/2001

OTHER PUBLICATIONS

Alan R. Earls, "Sidebar: Knowing Whom to Trust," Computerworld, Apr. 19, 2004. (4 pages).

(Continued)

*Primary Examiner* — Christopher A Revak
(74) *Attorney, Agent, or Firm* — Finnegan, Henderson Farabow, Garrett & Dunner, LLP

(57) ABSTRACT

Systems and methods consistent with the present invention enable explicit and multilateral trust across a community of federated servers via a network. A trusted third party establishes a framework of policies and procedures governing a federation. Organizations joining the federation submit to an audit process of internal policies and procedures to ensure compliance with the policies and procedures of the federation. Upon successful completion of an audit, an organization may receive a digital certificate containing the digital public key of the organization and indicating approval of the trusted third party. The organization may then use the associated digital private key for signing security assertions associated with a request for resources from another federation service provider. The service provider may trust the assertion from the organization based on trust placed in trusted third party by the service provider and the trust placed in the organization by the trusted third party.

44 Claims, 9 Drawing Sheets

U.S. PATENT DOCUMENTS

| | | | | |
|---|---|---|---|---|
| 2004/0259633 | A1* | 12/2004 | Gentles et al. | 463/29 |
| 2004/0259640 | A1* | 12/2004 | Gentles et al. | 463/42 |
| 2004/0266523 | A1* | 12/2004 | Gentles et al. | 463/29 |
| 2005/0021964 | A1* | 1/2005 | Bhatnagar et al. | 713/175 |
| 2005/0223217 | A1* | 10/2005 | Howard et al. | 713/155 |
| 2006/0021019 | A1* | 1/2006 | Hinton et al. | 726/10 |

OTHER PUBLICATIONS

Ping Identity, SourceID Product Overview, http://www.pingidentity.com/products/sourceid, accessed Jan. 19, 2006. (3 pages).

Ping Identity, PingFederate Product Overview, http://www.pingidentity.com/products/pingfederate, accessed Jan. 19, 2006. (4 pages).

Ping Identity, PingSTS Product Overview, http://www.pingidentity.com/products/pingsts, accessed Jan. 19, 2006. (3 pages).

Tari, "Using Agents for Secure Access to Data in the Internet," IEEE Communications Magazine, IEEE Service Center, NY, NY, vol. 5, No. 6, Jun. 6, 1997, pp. 136-140.

PCT International Search Report for Application No. PCT/US2005/045383, mailed May 8, 2006.

Communication from European Patent Office in counterpart Application No. 08 854 155.8 mailed May 6, 2010 (6 pages).

Prateek Mishra, *Bindings and Profiles for the Oasis Security Assertion Markup Language (SAML)* (2002) (pp. 1-30).

* cited by examiner

SYSTEMS AND METHODS FOR ENABLING TRUST IN A FEDERATED COLLABORATION

I. RELATED APPLICATIONS

Applicants claim the right to priority under 35 U.S.C. §119(e) based on Provisional Patent Application No. 60/635,984, entitled "ENABLING TRUST IN FEDERATED COLLABORATION," filed Dec. 15, 2004 which is expressly incorporated herein by reference in its entirety.

II. BACKGROUND OF THE INVENTION

A. Field of the Invention

The present invention relates to methods and systems for enabling trust in a federated collaboration. More specifically, the present invention relates to systems and methods for enabling single sign-on access to resources by providing explicit, transitive multilateral trust within a federation that involves a trusted third party.

B. Description of the Related Art

Since its inception, the Internet has undesirably enabled unauthorized entities to gain access to information belonging to others. As the presence of the Internet has grown, so have the needs of organizations to store and transmit information securely. Early on, the Internet provided users little if any security. Information residing on unsecured computers connected to the Internet was at risk of invasion and access by unauthorized parties. Unencrypted information packets transmitted through the Internet to other computers could be intercepted and read by entities, authorized or not, with equipment for doing so. Such a lack of security left organizations open to attack, theft of information, and potential fraud.

As businesses expanded in scope and complexity, business processes also expanded beyond organizational boundaries along with technological systems enabling secure access to those business processes. For example, an organization with several thousand employees who require access to 401(k) information, a health care service provider, a child care provider, and off-site document management services faces a significant identity management workload. Scaling IT user identity systems to handle transactions meeting the needs of such large organizations increases complexity exponentially due primarily to the fact that current IT based security and encryption methods were designed at a time when enterprises operated in isolation.

In basic form, user identification involves the use of "credentials," typically a username and password transmitted over a network and authenticated via various methods. Such information must typically be entered and transmitted each time a secure resource is accessed by a user. This method is cumbersome for many reasons, particularly in that it requires accounts maintaining identity and authorization information be set up and provisioned at many different secured service providers, requires users to remember many potentially different usernames and passwords, and often provides no encryption of data, thereby rendering the identity information vulnerable to attack. Further, while a user accessing a secure resource may be identified, there may be no mechanism by which that user may verify the identity of the service provider. Such a lack of two-way security may result in compromised information due to actions taken by unauthorized parties. Regardless of the form of the credentials used, their purpose is to bind a user to their identity within the context of an account. An account includes a collection of identity attributes about a user. These attributes are traditionally stored redundantly and with varying degrees of accuracy, freshness, and consistency in several repositories. Identity attributes associated with accounts typically include users' unique identifiers, names, postal addresses, organizational affiliations, and roles in those organizations.

Public Key Infrastructure (PKI) was introduced to provide an increased level of confidence for exchanging information over an increasingly insecure Internet. PKI is generally the use of a public/private key pair for encryption and proof of identity. Depending on how it is implemented, PKI generally offers its users assurance of the confidentiality and integrity of information sent and received electronically, and assurance of the source and destination of that information. This is accomplished using a mathematical technique called public key cryptography or asymmetric key cryptography, whereby a pair of related cryptographic keys—public and private—are used to enable authentication, message encryption, session confidentiality, digital signatures, trusted time-stamping, and other security features. To support these features with public key cryptography, public keys are strongly bound to a subject's identity on a "public key certificate," which is issued by a certificate authority (CA). CAs generally operate under published certificate policies (CPs) and certification practice statements (CPSs), and are thoroughly audited prior to initiating operations, and throughout their operational lifecycle. One practice that a CA may use to strengthen the binding of a subject's credential to that subject's identity is to require the subject, prior to certificate issuance, to be proofed in person by a trusted agent of the CA and to bring various legal documents, including passports and birth certificates, to that proofing session. Upon issuance by CA, a public key certificate may be distributed through various means and channels, including insecure connections.

PKI is an important component of a unified, end-to-end identity management (IdM) environment, but it's not the only critical trust and security infrastructure. Organizations have invested heavily in PKI to support strong assurance on the authentication process, which ensures that person presenting credentials to an online application or other resource is in fact who they claim to be.

However, PKI does not adequately address the problem of linking an authoritative digital identity with an e-mail, local area network (LAN), enterprise resource planning (ERP), or other application accounts—a function known as "account provisioning."

In addition, PKI digital certificates don't provide sufficient information that applications need for authorization—in other words, to determine whether a particular user should be granted access to enterprise resources, such as applications, documents and data records.

Furthermore, PKIs haven't been universally deployed and integrated with all applications, platforms, and devices. Among other issues, it's quite difficult to set up and administer all of the requisite trust relationships among PKIs in use through a heterogeneous, multinational, B2B supply chain.

Consequently, PKI-based security infrastructures are not sufficient to address the requirements of distributed, multi-organizational identity, account, and credential management environments. Frequently, one of the requirements—and risks—of distributed identity management environments, is the need for each organization to maintain separate identity accounts—with associated user attributes—for each user wishing to access the secure resources. This creates additional risks, for example, accounts on remote systems may not be managed to the same standards as an organization may use internally. Without a consistent standard of account management, it is possible that the organization's users may create and access external accounts without account managers being aware the accounts exist. This may lead to problems such as, employees who leave the organization maintaining access to other partner sites as though they were still employed with their former organization. Removing the duplication and ambiguity, while providing means for a comprehensive audit, may help mitigate such risks and free account managers for other, more important tasks.

For an organization with many users, management of accounts within the organization may require the resources of many additional employees, thereby adding significant cost. Additionally, entities that manage a large number of applications (e.g., an entity providing Human Resource services to many partner organizations), must manage a very large number of additional user accounts, potentially one account per service per user. Therefore, the total work required to manage all accounts, internally and for partner organizations, is potentially equal to the number of employees plus partner employees multiplied by the number of externally managed applications those employees use. For every organization and application that can depend on authentication by a single entity, the user management burden is significantly reduced. By eliminating the need to manage multiple accounts for a single user, associated account management costs can also be dramatically reduced.

A federation is any networked application environment within which interoperability spans two or more autonomous administrative domains, such as when two or more independent organizations interoperate within a business-to-business value chain, or among different business units within a large enterprise. A domain may be regarded as autonomous if it supports unilateral administration of its own users, resources, and policies, independent of other domains. Federated domains choose to interoperate in accordance with business agreements, trust relationships, interoperability arrangements, and their respective local policies. Typically, federated domains honor each others' decisions within well-defined spheres of operation.

Federated IdM is an emerging industry best practice for dealing with the heterogeneous, dynamic, loosely coupled trust relationships that characterize companies' external and internal supply chains. Federated IdM enables strong authentication, Web single sign-on (SSO), role-based access control (RBAC), and other trust-enabled security services across diverse identity, security, and application domains.

Federated IdM environments define what amounts to an abstraction layer over the legacy identity and security environments of diverse domains. Each domain maps its local identities and attributes to the agreed-upon schemas and syntaxes. Federated IdM environments generally leverage and interface a broad range of existing, heterogeneous infrastructure services. Consequently, domains can retain their internal directory, meta-directory, account provisioning, and PKI services, as long as their external IdM interfaces implement a common federated IdM standard such as Security Assertion Markup Language (SAML), or other identity and attribute conveyance format.

Federated IdM is enabled through standards, technologies, and agreements that allow organizations to interchange and validate identities, attributes, roles, and permissions across autonomous domains. Within a federated IdM environment, a user can log into his or her company's domain and then leverage that authentication to access resources transparently in external domains, such as those managed by customers or suppliers, subject to various policies defined by local and external administrators.

A federated business model enables an enterprise to share selected identity information about their users with trusted partners. This enables partner companies to make access management decisions without having to administer distinct identity accounts for third-party users. Federation allows autonomous domains to maintain control over their respective users' identities, as well as over the resources that they allow internal and external users to access. In a federated environment, identity information need not be replicated or synchronized across diverse federated domains. Instead, identities and other attributes can continue to be stored, managed, and controlled locally by the administrators of the domain in which they are registered.

Federated IdM is well-suited to the heterogeneous, decentralized, loosely coupled fabric of modern e-commerce. In the real world, no one administrator has responsibility for registering all users, activating all accounts, and granting all access privileges in B2B environments, or in many large, multidivisional companies. At the same time, though, administrators of the various domains don't want to give up local control and storage of identity information. Consequently, federated IdM may be regarded as a mechanism for enterprises to address the authorization challenge, while not taking on the burden of third-party user account management.

Federation may be bilateral or multilateral in topology. FIG. 1 depicts a bilateral federation model, in which users' identities are managed by an "identity provider" (Identity provider), such as their employer, and resources (such as applications and databases) are managed by an external "service provider" (service provider), such as a partner organization. In this example, the user registers an identity, account, credentials, and other attributes at its employer and securely accesses information hosted at a single partner organization. Partners in a federated identity management system depend on one another to authenticate their respective users and vouch for their identity and access privileges. In this particular bilateral federation example, transitive trust does not exist; consequently, the Identity provider must maintain separate federation arrangements, implemented through processes and technology, with each partner service provider. If two organizations implementing disparate identity management systems attempt to partner, each must adapt and modify their current system to further enable interaction with the system of the other. If one partner organization elects to change identity management systems at a point later in time, the other partner is faced with a choice to adapt, or cease federated interactions with that partner. For example, there are multiple standard formats, syntaxes, and protocols which an organization may choose from in order to implement such a system including, Security Assertion Markup Language (SAML), Service Provisioning Markup Language (SPML), or X.509 Attribute Certificates. This flexibility leads to difficulties when attempting cross organization trust relationships. When disparate protocols are utilized by partnering organizations due to lack of a standard or for other reasons, the partner organizations must either introduce additional systems and software for translating assertions or cease interacting with the partner organization on the federated level.

FIG. 2 depicts a multilateral federation that has been composed from a mesh of bilateral arrangements among many partnering organizations. One of skill in the art will recognize that such a system leads to high costs due to the requirements for obtaining such a large number of agreements, as well as the fact that management/enforcement of such agreements becomes increasingly more difficult as the number of agreements increases.

One of skill in the art will further recognize that while federation provides a sound technological underpinning that can enable flexible e-business processes, federation depends on the strength of the trust between Identity providers and service providers. That trust, in turn, is based on each organization's understanding and acceptance of partnering organizations' identity, credential, and account management policies and practices. Currently, there is no open, industry-standard identity policy framework that overcomes the shortcomings of the related art, that encompasses legal, financial, operational and technical standards, and that allows enterprises to publish their policies and practices in a common format. Therefore, it is apparent to one of skill in the art that there is a need for such a standard identity policy and practice framework, which would allow enterprises to explicitly declare their own identity, credential, and account management policies and practices, and to explicitly review, accept, and trust partnering organizations' equivalent policies and practices.

It will also be apparent to one of skill in the art that there is a need for a security architecture in which multilateral trust is facilitated by a trusted third party, thereby allowing multiple parties in a community of interest to accept specific identity claims, assertions, tokens, and credentials from one another without requiring prearranged trust agreements between each participating organization.

This invention addresses these needs in various embodiments of systems and methods for enabling an explicit, multilateral, transitive, federated trust architecture that includes a trusted third party and a standard identity policy and practice framework.

III. SUMMARY

It is to be understood that both the foregoing general description and the following detailed description are exemplary and explanatory only and are not restrictive of the invention, as claimed.

Systems and methods consistent with the present invention enable explicit and multilateral trust across a networked community of federated organizations, which may perform Identity provider, service provider, or both roles within the context of a particular identity federation. A trusted third party establishes a framework of policies and procedures governing a federation. Identity providers joining the federation submit to an audit process of internal policies and procedures to ensure compliance with the policies and procedures of the federation. Upon successful completion of an audit, an Identity provider may receive an identifying artifact such as a digital certificate, from a trusted third party indicating the trusted third party's approval of the Identity provider's identity, credential, and account management policies and practices. The Identity provider may then use its digital private key (which is cryptographically bound to their public key and identity on that certificate) for signing security assertions associated with a request for resources managed by a federated service provider. The service provider may trust the assertion from the Identity provider based on trust placed in the trusted third party by the service provider and the trust placed in the Identity provider by the trusted third party.

One embodiment consistent with the invention includes a method for providing a request over a network. The method includes the steps of receiving an indication of the request; responsive to a determination that a trust relationship exists, specifying a data structure in accordance with a predetermined policy and comprising an attribute associated with a requester; associating the data structure with the request; digitally signing the data structure; and transmitting the data structure to a service provider.

Another embodiment includes a method for receiving a resource over a network. The method includes the steps of determining credentials associated with a requester requesting a resource; creating a first data structure in accordance with a policy, wherein the first data structure comprises an attribute associated with the credentials; associating the first data structure with a second data structure containing the request for a resource; processing a set comprising the first data structure and second data structure to yield a resulting digitally signed data structure; providing the digitally signed data structure to a service provider via the network; and receiving the requested resource via the network from the service provider, wherein the service provider transmits the requested resource to the requester based on a first relationship between the service provider and a trusted third party and a second relationship between the trusted third party and the requester.

Yet another embodiment includes a method for enabling transitive trust in a federated network configuration. The method includes the steps of developing, by actions of a trusted third party, policies related to operating the federated network configuration, wherein the policies include procedures for associating attributes with a request from a requester, for a resource, digitally signing, by the requester, the attributes and the request for a resource, transmitting the requested resource, by a service provider, to the requester based on trust established between the service provider and the trusted third party, and trust established between the trusted third party and the requester; granting access to the policies; auditing an applicant to the federated network configuration for compliance with the policies; and issuing an artifact to the applicant.

IV. BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

V. DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

Figure 1:
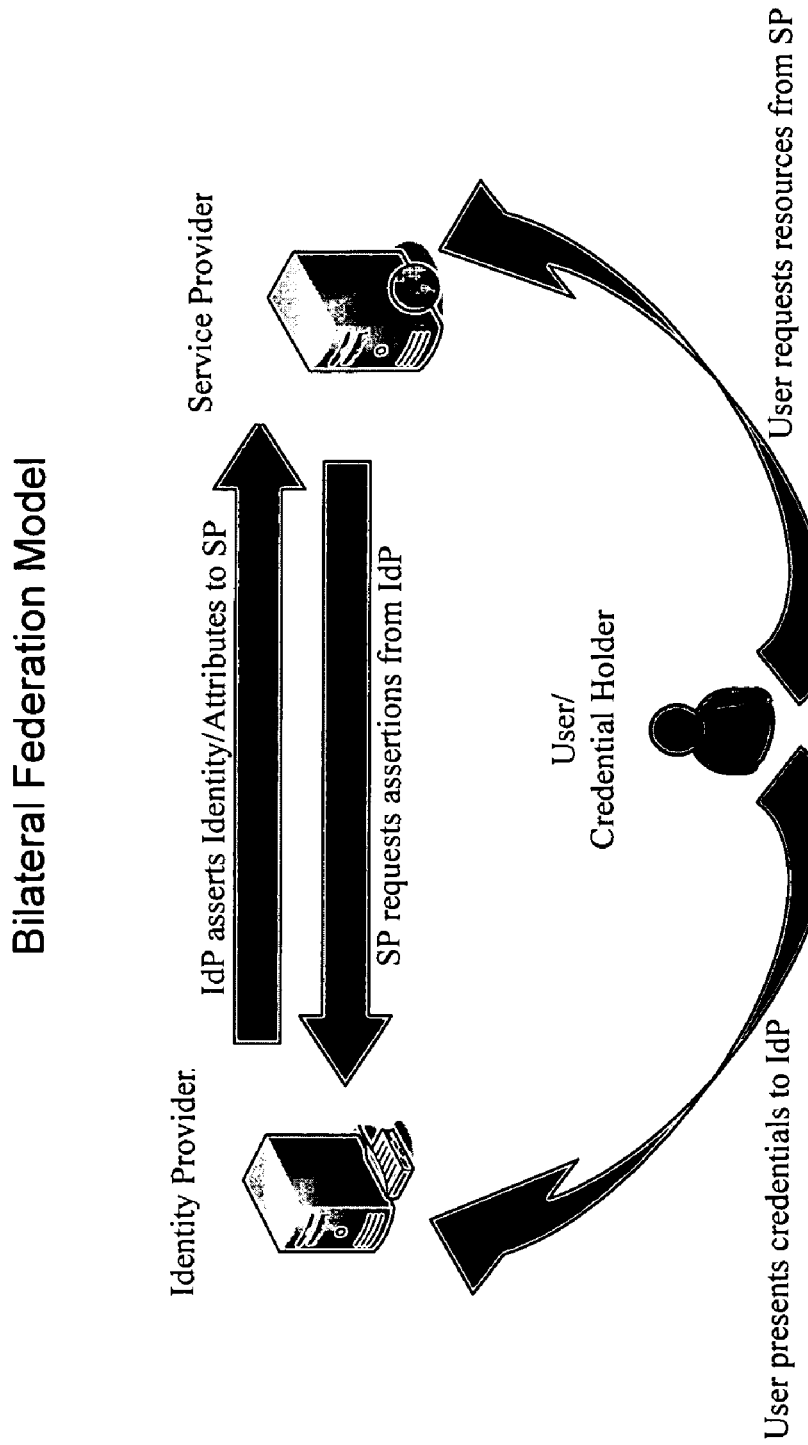
FIG. 1 depicts a bilateral federation model, in which users' identities are managed by an "identity provider" (Identity provider), such as their employer, and resources (such as applications and databases) are managed by an external "service provider" (service provider), such as a partner organization.
Figure 2:
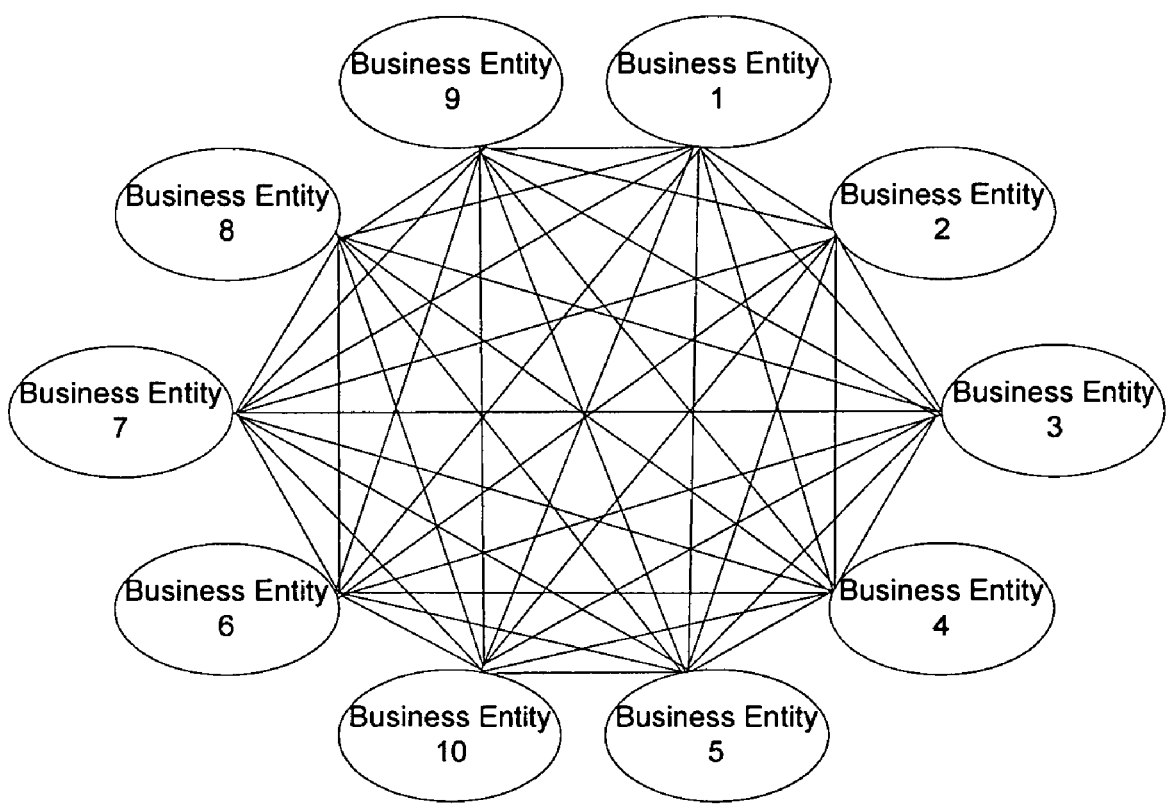
FIG. 2 depicts a multilateral federation that has been composed from a mesh of bilateral arrangements among many partnering organizations.
Figure 3A:
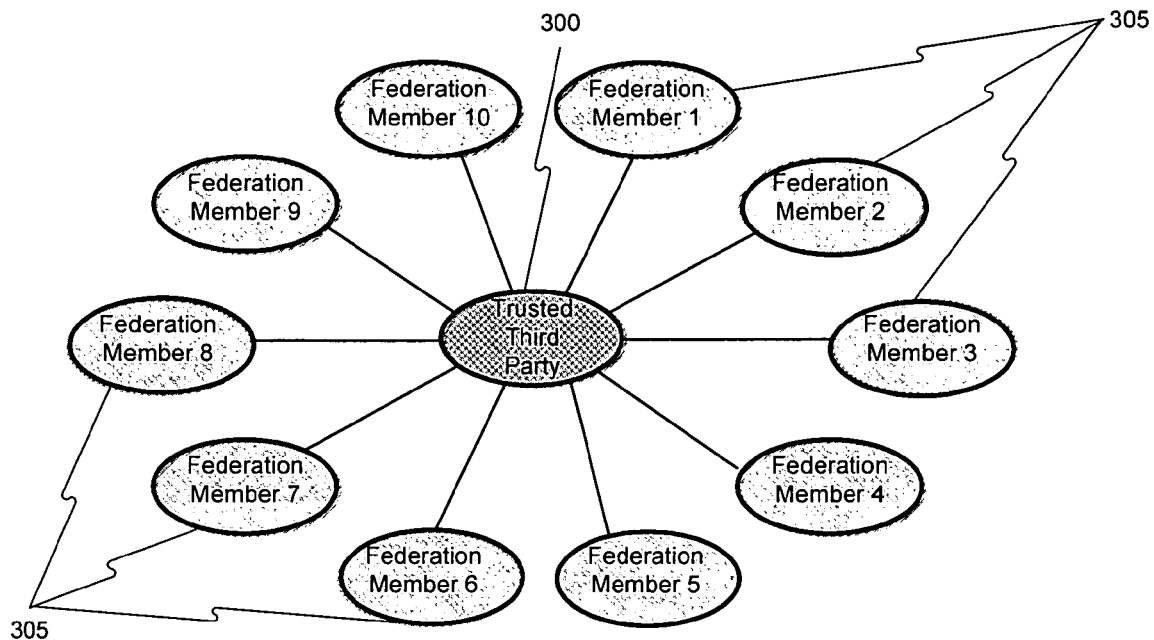
FIG. 3A is a depiction of a multilateral federation architecture, hubbed by a trusted third party, that is consistent with an embodiment of the present invention.

Methods and systems consistent with the present invention provide a trusted-third-party-hubbed, multilateral, explicit system of trust among a community of interest also known as a federation. FIG. 3A is a depiction of a federation architecture consistent with an embodiment of the present invention. A trusted third party 300 enables transitive trust among member organizations 305 within the federation. Transitive trust may be enabled through the development of policies and procedures by trusted third party 300 and execution of legally binding agreements, setting out the terms of federation membership, between federation members 305 and trusted third party 300. Because trusted third party 300 may audit and obtain agreements with each federation member 305, and each federation member 305 in turn trusts trusted third party 300 to have done so, each federation member 305 may be assured that digitally signed information from other federation members is accurate and trustworthy.

Trusted third party 300 may be responsible for establishing and maintaining security policies and procedures governing the federated community. Alternatively, trusted third party 300 may delegate the creation of policies and procedures to groups or subgroups as desired. Policy and procedure establishment will be discussed in greater detail with reference to FIG. 6. Organizations wishing to join the federation may undergo an audit/investigation procedure as discussed in greater detail with reference to FIG. 7. Upon passing such a procedure, an organization may sign an agreement with trusted third party 300 thereby joining and operating within the federation. Legal agreements between an organization and a trusted third party are discussed in greater detail with reference to FIG. 7.

Figure 3B:
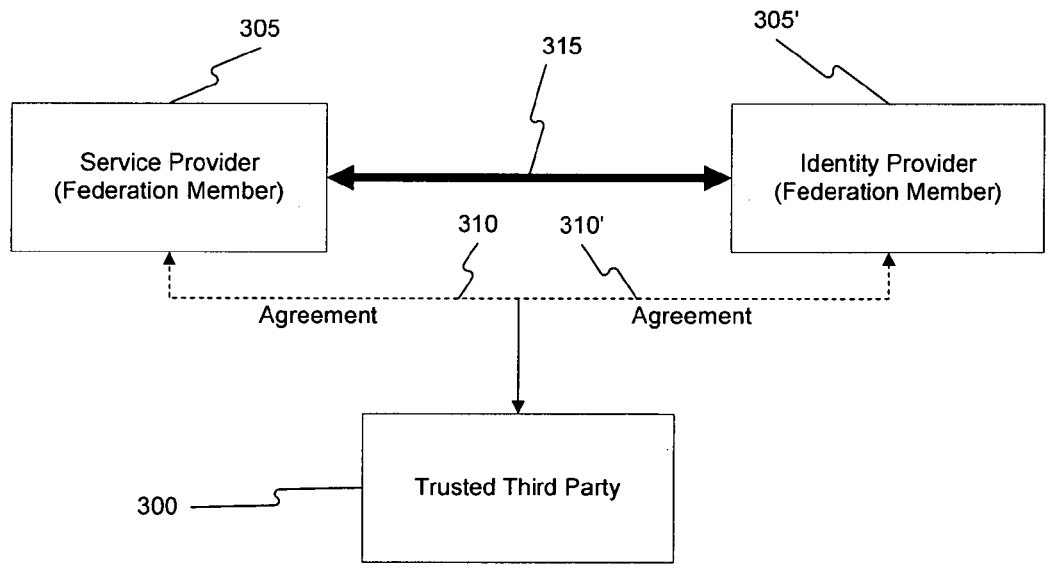
FIG. 3B is an exemplary depiction of the relationship between two organizations within a federation and trusted third party 300 consistent with an embodiment of the present invention.

FIG. 3B is an exemplary depiction of the relationship between two organizations within a federation and trusted third party 300 consistent with one embodiment of the present invention. Federation members 305 and 305' may operate both as service providers and identity providers. An agreement to comply with policies and procedures 310 between federation member 305 and trusted third party 300, combined with an agreement to comply with policies and procedures 310' between federation member 305' and trusted third party 300, enables multilateral transitive trust 315. In other words, a digitally signed identity assertion comprising user credentials stored at federation member 305 (in this case the identity provider) may be explicitly trusted by federation member 305' (in this case the service provider), or any other member within the federation. Trusted third party 300 explicitly endorses such an identity assertion and federation member 305' explicitly trusts trusted third party 300. Likewise, a digitally signed identity assertion comprising user credentials stored at federation member 305' may be trusted by federation member 305, or any other federation member for the same reasons. Transitive trust is possible based on the agreements between each individual federation member and trusted third party 300.

Figure 4A:
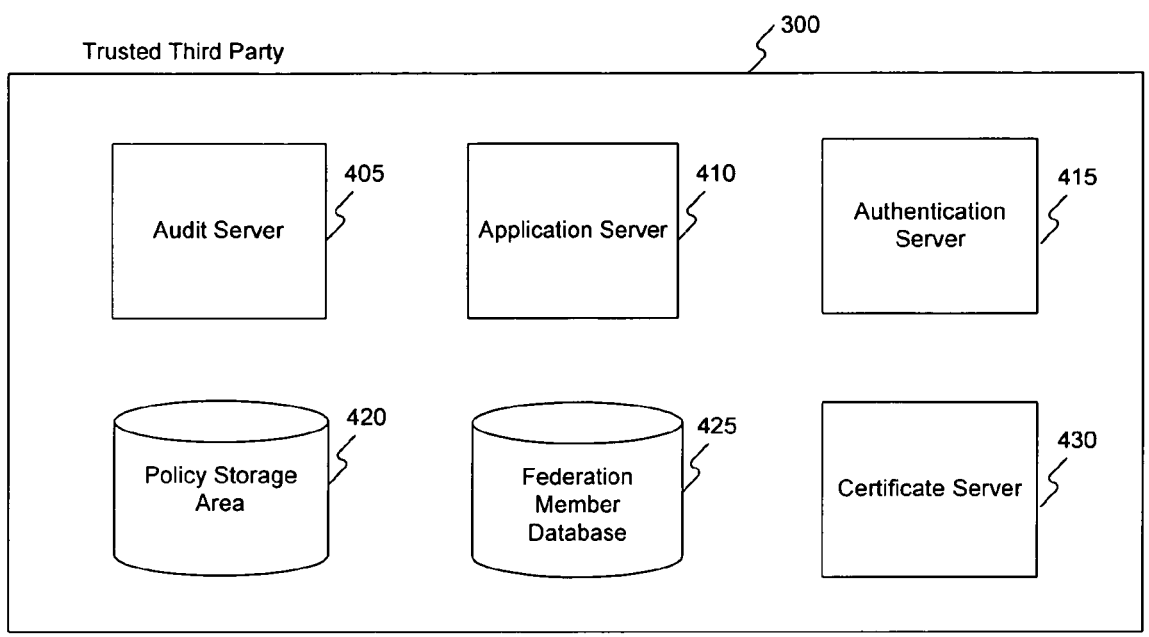
FIG. 4A is a detailed block diagram of functional components (to which are associated with various system components and business processes) that may be implemented by a trusted third party 300 consistent with an embodiment of the present invention.

FIG. 4A is a detailed block diagram of functional components (which are associated with various system components and business processes) that may be implemented by a trusted third party 300 consistent with an embodiment of the present invention. Trusted third party 300 may include, for example, such functional components as an audit server 405, an application server 410, an authentication server 415, a policy storage area 420, a federation member database 425, and a certificate server 430. A audit server 405 may monitor, collect, and store information regarding identity assertions and transactions made within the federation for reasons including, for example, determination of policy breaches, responsibility for a breach, and overall federation load. Those skilled in the art will recognize that the servers and storage may be implemented using one or more computers and associated software such as operating system software, web server software, and the like.

Application server 410 may provide, for example, web services, Internet access to federation information, and attribute name mapping of user attributes contained in identity assertions. Authentication server 415 may process and evaluate identity assertions received by trusted third party 300 from other federation members or may authenticate entities outside the federation for access to such items as pending or in progress applications to the federation. Policy storage area 420 may consist of a repository such as a hard disk drive, database, or other storage means where the policies and procedures defining compliance within the federation are stored. Such materials may be made available, for example, over the Internet, such that interested organizations may have access to view and evaluate the policies and procedures. Federation member database 425 may be a repository such as a hard disk, database, or other storage means. Federation member database 425 may collect and store information related to federation members including, for example, federation agreements and user attribute name mapping information. Federation agreements may be accessed, for example, when a question arises as to a federation member's liability for a breach of policies and procedures stored in policy storage area 420. Attribute name mapping information may be accessed for example, when an identity assertion is received containing field names unrecognized by the federation member receiving the identity assertion.

Certificate server 430 may perform tasks related to generation of digital certificates (e.g., X.509 certificates), storage of public keys of federation members, and issuance/storage of certificate revocation lists (CRL). Once an organization has been audited and approved for membership in the federation, that organization may receive an identifying artifact (e.g., digital certificate) generated by certificate server 430, which indicates such approval and membership in the federation. Creation of digital certificates is discussed in greater detail with reference to FIG. 7, while utilization of digital certificates is discussed in greater detail with reference to FIG. 8.

Certificate server 430 may also maintain a CRL for the federation, thereby enabling federation members to ensure the validity of a digital certificate from an identity provider. A CRL is a list of digital certificates which have been revoked, are no longer valid, and should not be relied upon by any federation member. Reasons for revocation of a digital certificate may include, for example, discovery that the trusted third party 300 has improperly issued a digital certificate, where a private-key has been compromised, and failure of the revoked organization to adhere to policy and procedure requirements of the federation. Federation members may access the CRL for each identity assertion received in order to ensure that reliance is not placed on a revoked digital certificate. Verification of digital certificate validity is discussed in greater detail with reference to FIG. 8.

A skilled artisan will recognize that trusted third party 300 may contain more or fewer components than are shown in FIG. 4A. For example, the functionality of audit server 405, application server 410, and authentication server 415 may be combined on one server, as may policy storage area 420 and federation member database 425. The operation of the components of trusted third party 300 is described in greater detail below with reference to FIGS. 5-9.

Figure 4B:
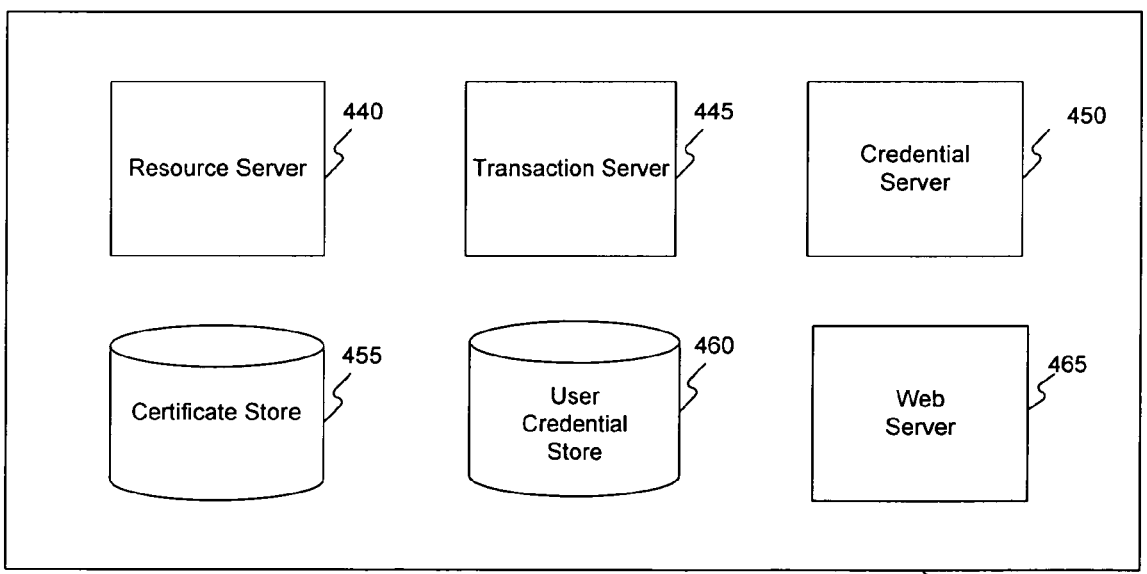
FIG. 4B is a detailed block diagram of a federation member—Identity provider and/or service provider—consistent with an embodiment of the present invention.

FIG. 4B is a detailed block diagram of a federation member—Identity provider and/or service provider—consistent with an embodiment of the present invention. Federation member 402 may include, for example, a resource server 440, a transaction server 445, a credential server 450, a certificate store 455, a user credential store 460, and a web server 465. A resource server 440 may provide access to primary resources made available by federation member 402. For example, a provider of health care insurance may make information related to member benefits and claims available via the Internet. Resource server 440, in combination with web server 465 may provide users access to such information through the Internet after validation of credentials by credential server 450. Transaction server 445 may collect and store data related to identity assertions and resource requests made to federation member 402. Transaction server 445 may also collect and store information related to signed identity assertions comprising user credentials stored within user credential store 460 at federation member 402. Transaction server 445 may communicate with audit server 405 at trusted third party 300 in order to provide audit server 405 information for auditing and fault resolution in the event a breach of policies and procedures is alleged.

Credential server 450 may provide both signed identity assertions on behalf of users with credentials stored in user credential store 460 and authentication of identity assertions received from outside the federation member's organization. To provide signed identity assertions, credential server 450 may communicate with certificate store 455 to obtain a private signing key generated by federation member 402. The private signing key and the process of identity assertion signing is discussed in greater detail with reference to FIG. 8. Validation of received identity assertions may also require credential server 450 to communicate with certificate store 455 to retrieve the trusted third party root certificate and a public key associated with the signature from an organization asserting identity of a user. Validation of a signed identity assertion is discussed in greater detail with reference to FIG. 8.

Certificate store 455 may maintain digital certificates and keys for signing and validating signed identity assertions. Certificate store 455 may store, for example, a trusted third party root certificate, public/private keys, and the federation member's digital certificate or other identifying artifact issued by trusted third party 300. User credential store 460 may collect and store credential information and attributes related to users within federation member's organization. For example, users may possess attributes including, for example, "date of birth," "affiliation," and "citizenship." Such attributes may be compiled by credential server 450 and provided in a signed identity assertion sent by federation member 402 in its capacity as an identity provider. The process of asserting identity is discussed in greater detail with reference to FIG. 8.

A skilled artisan will recognize that federation member 402 may contain more or fewer components than are shown in FIG. 4B. For example, certificate store 455 and user credential store 460 may reside within the same storage area or database. Further, the functionality of resource server 440, transaction server 445, credential server 450, and web server 465 may be combined on a single server or separated into as many servers as desired.

In one example consistent with the present invention, an organization desiring to act as a trusted third party 300 establishes an identity policy management authority which in turn establishes a series of working groups for developing a framework of standardized policies and procedures. Such policies and procedures may cover tasks including, for example, proofing and vetting of user identities; auditing potential federation members; technical implementation of identity management; and remedies for breach of the policies and procedures. The policies and procedures may be developed with the input of concerned industry entities with a goal of standardization and publication. Standardization allows the trusted third party 300 to publish the policies and procedures for any interested organization to view and determine if policies meet the standard. If an interested organization believes its policies and procedures meet the standard, or modifies policies and procedures such that they meet the standard, the interested organization may then apply for admission to the federation maintained by the trusted third party 300.

Upon receiving an organization's application to join the federation, trusted third party 300 may perform procedures according to the established policies and procedures for validating an organization's compliance with the established policies and procedures. Once the organization has been certified and trusted third party 300 is satisfied that the organization meets the requirements as set forth in the policies and procedures, trusted third party 300 may obtain an executed and legally binding agreement between trusted third party 300 and the organization. The agreement may indicate, among other things, an organization's willingness to be bound by the policies and procedures as established by the trusted third party 300 and to provide a remedy in the event of a breach of the policies and procedures by the organization.

Following execution of an agreement between trusted third party 300 and an Identity provider, the trusted third party 300 may provide the newly joined Identity provider, now a federation member (and an identity provider), an identifying artifact such as a digital certificate, indicating trusted third party's approval of the Identity provider's identity, credential, and account management policies and practices. A digital certificate may contain a public key for the Identity provider that is cryptographically bound to an identifier uniquely associated with that Identity provider and to a private key to which only that Identity provider has access, is maintained at all times by the Identity provider, and may be protected. Because the digital certificate containing the associated public key also contains information indicating trusted third party 300 has validated the organization, should an unauthorized entity gain access to the private key, that entity may use the private key to sign identity assertions that may be invalid yet relied upon by an unwitting service provider within the federation. Disclosure of that private key may constitute a breach of policy under the policies of the federation.

An identity provider may act as a user repository with the ability to sign identity assertions on behalf of its users, thereby certifying the assertions, claims, and tokens submitted to a service provider as well as user attributes associated with those assertions, claims, and tokens. Each attribute in the identity assertion may be trusted individually. The identity assertions are multilateral in that transitive trust exists as a result of the agreements created between trusted third party 300 and each identity provider. Because each identity provider has agreed to the policies and procedures of the security framework, and each has been audited by a single entity responsible for ensuring compliance, any federation member may trust another federation member's identity assertion.

In the event a breach is alleged by a service provider within the federation, trusted third party 300 may perform an audit of the incident to determine the causal factors related to the breach. Upon verification of a breach and determination of the cause, trusted third party 300 may provide a remedy to the affected service provider based on the policies and procedures of the federation and the federation agreement with the service provider. Trusted third party 300 may in turn seek reimbursement for damages paid from the federation member determined to be responsible for the breach as defined in the federation policies and procedures and the federation agreement with the breaching party. Alternatively, depending on the terms of the federation agreement, reimbursement for such damages may flow directly from the breaching party to another federation member, without the need for trusted third party to be involved in legal actions between the federation members.

Figure 5:
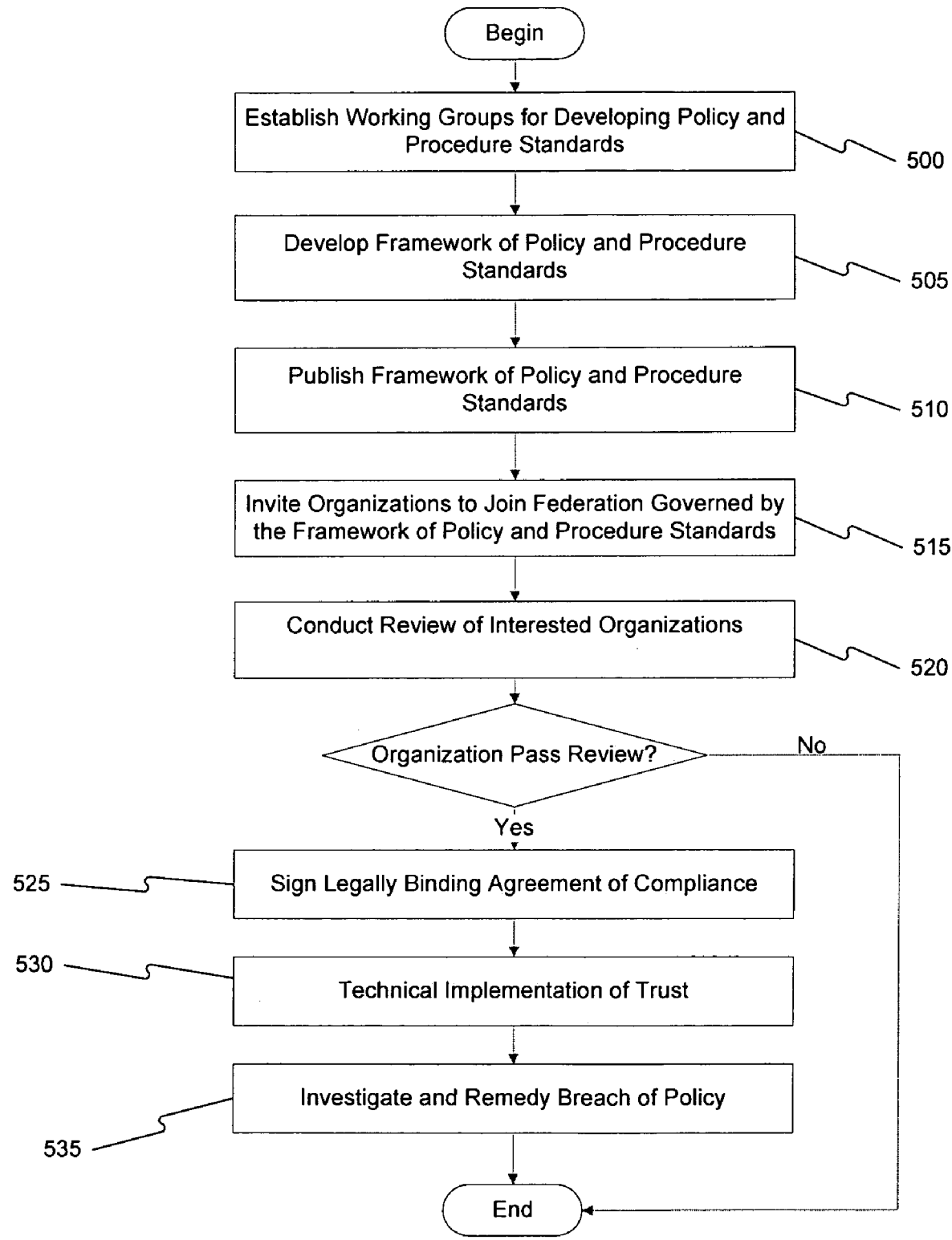
FIG. 5 is a high level flow chart depicting an exemplary method for establishing an explicit, multilateral, trusted-third-party-hubbed, federated architecture consistent with one embodiment of the present invention.

FIG. 5 is a high level flow chart depicting an exemplary method for establishing an explicit, multilateral, trusted-third-party-hubbed, federated architecture consistent with one embodiment of the present invention. To establish a workable framework of policies and procedures with industry comments and by which many organizations may comply, trusted third party 300 may create a series of working groups for development of such a framework (step 500). Such working groups may be responsible for different areas of policy development, including, for example, a group for developing technical standards, a group for developing security policies, and a group for developing legal documents. Such working groups may be comprised of individuals from throughout a particular industry in order to obtain diversity and views from many different organizations. Alternatively, such working groups may be comprised of members exclusively from trusted third party 300 organization. In such an embodiment, input from other industry members regarding policies and practices may be received during a notice and comment period or a request for comments (RFC) available via the Internet. Formation of working groups is discussed in greater detail with reference to FIG. 6.

Following the formation of working groups and receipt of any input from interested industry members, the working groups may develop policies, procedures, and legal documents related to formation of the federation (step 505). The policies, procedures, and legal documents may include, for example, policies on storage of a secret private signing key, procedures for vetting user identities, procedures for binding credentials to a user, procedures for implementing identity assertion signing, policies for inclusion of user attributes within an identity assertion, resolution of an alleged breach of the policies and procedures, presentation of information as a result of a security audit, and remedies to a harmed federation member in the event of a breach of the policies and procedures. For example, a policy may be developed specifying the contents of a signed identity assertion. Such a policy may indicate that every signed identity assertion within the federation must contain a field for a user's citizenship. Where federation member 305' asserts an identity to federation member 305, with an identity assertion lacking information regarding citizenship (i.e., missing citizenship data or any field name mapping to citizenship), or containing inaccurate citizenship information, a breach of policy may be determined. Depending on the language drafted in the policies and procedures, federation member 305 may be entitled to a remedy for any harm incurred as a result of the breach. Resolution of policy breach is discussed in greater detail with reference to FIG. 9.

Upon standardizing a framework of policies, procedures, and legal documents, trusted third party 300 may publish such a framework in order to make the framework accessible to organizations interested in joining the federation (step 510). Publication of the policies and procedures may also have the effect of causing other entities, who may or may not wish to join the federation, to come into compliance with the policies and procedures developed by the working groups, thereby increasing overall Internet security. Publication may be accomplished via such means as white papers, Internet postings, and any other method for providing such policies and procedures to the public. The publication of such standardized material by working groups may be similar to publication means used by W3C in publishing its standards related to, for example, HTML, XML, and CSS. Alternatively, in high security applications, such as military acquisition services, the policies and procedures may be made available on a request-only basis, and further restricted requiring full vetting and proofing before access to the policies and procedures is granted. This may deter unauthorized entities from attempting to circumvent the federation policies and procedures.

Once a framework of policies and procedures has been created and made available to organizations interested in participating in a federation governed by the published policies and procedures, such organizations may apply to "join" the federation (step 515). The application to join the federation may involve, for example, communicating an interest to trusted third party 300, completing an online application, and signing a waiver submitting to an investigation of current internal policies and procedures. Applications may enable trusted third party 300 to make an initial evaluation of an applicant for a quick determination of whether to proceed with the process. For example, an organization in existence less than one year may be prohibited from joining a federation based on federation policies and procedures. A review of an application from such an organization may eliminate that organization from further consideration. Alternatively, no prescreening may take place and each applicant may proceed through the audit process which may be defined in the developed policies and procedures as discussed above with regard to steps 500-510. The process of auditing an organization is discussed in greater detail with reference to step 520 and FIG. 7.

Following the application process, trusted third party 300 may perform an investigation or audit of an applicant organization (step 520). The investigation may include, for example, reviewing the applicant organization's IT infrastructure (e.g., certificate storage, private key protection, credential protection, etc.), evaluating the organization's methods for proofing/vetting identities, and reviewing the applicant organization's financial situation for ability to compensate in the event of a breach. Depending on the framework developed, an investigation may be more or less rigorous as the policies and procedures specify. For example, a framework outlining a policy whereby identification of a user's credentials involves presentation of a passport and imaging of a thumbprint may require an investigation of digital images associated with the credentials to ensure compliance. However, a framework outlining a policy whereby identification of a user's credentials involves only presentation of a valid driver's license and a utility bill indicating current address may require a comparison of documents with information from the department of motor vehicles. In another embodiment, organization review and auditing procedures may be carried out by a third party contractor to trusted third party 300. Auditing of an applicant organization for compliance with federation policies and procedures is discussed further with reference to FIG. 7.

Once an applicant organization has been approved by trusted third party 300 for membership in the federation, that organization may become a federation member by signing a legally binding agreement with trusted third party 300 (step 525). Such an agreement may include, for example, federation member's approval of the policies, procedures and guidelines established by trusted third party 300; willingness to comply with the same; willingness to submit to an audit of infrastructure at any time; and willingness to pay damages in the event of a breach for which the federation member is responsible. Agreements between trusted third party 300 and federation members may be important in creating a multilateral transitive trust architecture for reasons including, ensuring ongoing compliance with the policies and procedures of the federation, and ensuring a remedy exists in the case where policies and procedures are not followed. Execution of agreements to comply is discussed in greater detail with reference to FIG. 7.

Once an organization has become a federation member by successfully completing the audit and review process (step 520) and signing the legally binding agreement with trusted third party 300 (step 525), technical aspects of the federation may be implemented at federation member 305 (step 530). Technical implementation of the federation may include, for example, generation of a new public/private key pair, generation of a digital certificate by trusted third party 300, installation of software for generating and signing identity assertions, and modification of existing applications to validate identity assertions based on authorized credentials. For example, upon joining the federation, a federation member may generate a new public/private key pair used for signing identity assertions. The public portion of the pair may be provided to trusted third party 300 for a digital certificate, indicating trusted third party's approval of federation member 305, to be generated and provided to federation member 305. Public/private key generation and certification are discussed in greater detail with reference to FIG. 7, while an exemplary technical implementation consistent with the present invention is discussed in greater detail with reference to FIG. 8.

Once technical implementations of a federation have been completed, monitoring and investigation of breaches of policy agreements may be implemented (step 535). Monitoring and auditing for policy breach may be performed by federation service providers, trusted third party 300, a third party monitor, or any other monitoring means. For example, federation member "A" may receive a signed identity assertion from federation member "B" containing information related to a user who is no longer an employee at federation member "B." Federation policies and procedures may mandate removal of credentials for terminated employees immediately following said employee's departure. Monitoring by a third party monitor service may reveal that user was terminated but user's credentials remain active in user credential store 460. Alternatively, a manual audit of federation member records by trusted third party 300 may reveal that the terminated user was never removed from user credential store 460 following termination. Therefore, it may be determined that a breach of the federation policies and procedures has occurred. Monitoring, investigation, and remedies for a breach of policy are discussed in greater detail with reference to FIG. 9.

Figure 6:
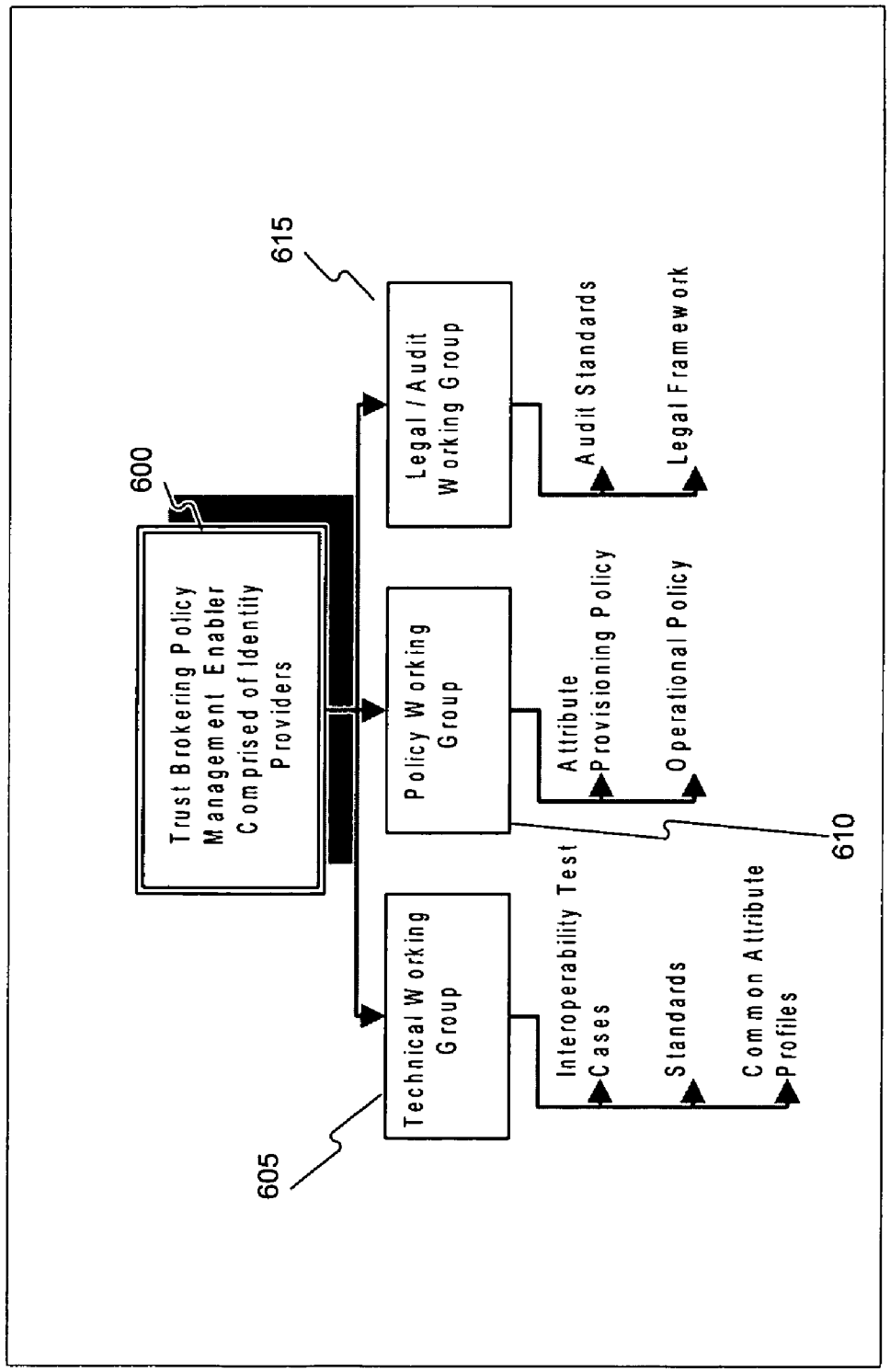
FIG. 6 is a depiction of workgroups established for developing policies and procedures consistent with an embodiment of the present invention.

FIG. 6 is a depiction of workgroups established for developing policies and procedures consistent with an embodiment of the present invention. To develop a fully comprehensive and widely acceptable framework of policies and procedures, it may be beneficial to create working groups comprised of participants from throughout a community of interest. For example, identity policy authority 600 may be comprised of individuals from throughout the aerospace industry and managed by trusted third party 300. Identity policy authority 600 may establish technical working group 605, policy working group 610, and legal/audit working group 615 as working groups for developing policies and procedures related to the community of interest. Technical working group 605 may be responsible for creating documentation including, for example, interoperability test cases, technical standards, and common attribute profiles. Interoperability test cases may, for example, present test cases designed to allow applicant organization to establish technical interoperability with other currently certified federation members. Technical standard documents may, for example, list detailed technical standards determined acceptable for use within the federation. For example, technical standards may include items such as namespace conventions, discovering an identity provider, and definition of authentication strength. Common attribute profile documents may, for example, list the names, formats, and acceptable ranges of data for the attributes, as determined by the technical working group, for a signed identity assertion. For example, a common attribute profile may define an identity assertion as containing a username, password, affiliation, industry, and citizenship.

Policy working group 610 may be responsible for creating documentation including, for example, attribute provisioning policies and operational policies. Attribute provisioning policies may, for example, describe the proofing requirements in order to establish a value for a given attribute within an identity assertion. For example, if a common attribute profile defines a citizenship attribute for use in an identity assertion, an attribute provisioning policy may mandate that such a user provide a valid passport indicating current citizenship data for the user. Operational policy documents may, for example, establish the baseline policies governing operation of the systems that store and deliver attributes to other federation members. For example, a policy may state that all identity assertions must be signed using the SHA-1 digital signature or other non-repudiation algorithm.

Legal/audit working group 615 may be responsible for creating documentation including, for example, audit standards and legal document frameworks. Audit standards may, for example, present the criteria and methodology auditors should follow to establish whether an applicant to the federation possesses the infrastructure to meet published technical requirements and whether a federation member has maintained compliance with the published baseline policies. Legal Framework documents may, for example, establish a framework for federation agreements, compliance agreements, and relying party agreements. The documents may be used, for example, to assist in ensuring federation member compliance with the published policies and procedures and for agreements limiting liability of one or more entities involved in the federation.

The documents generated by any of the groups above may be submitted for comment so that standardization may be accomplished. To have agreement among many different organizations (as generally required for standardization), such organizations will likely insist that their comments be taken into consideration in the creation of policies and procedures. To obtain public comment on the policies, procedures, and documents discussed above, methods including, for example, Internet-based request for comments, public internet discussion forums, and industry group meetings may be used. Once the interested organizations have agreed on the policies, procedures, and documents, trusted third party 300 may declare and publish them as standards.

Figure 7:
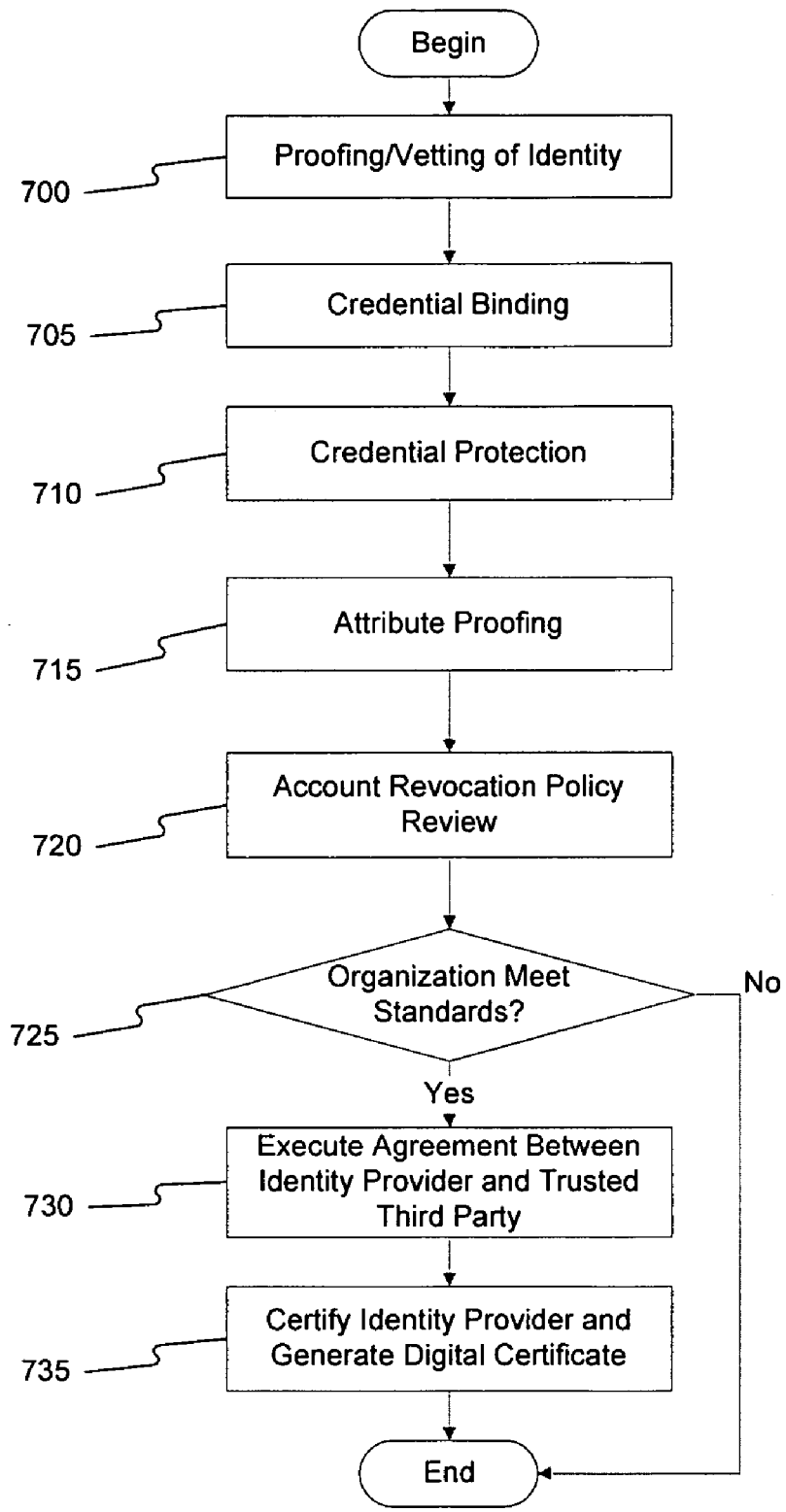
FIG. 7 is a flowchart depicting an exemplary process for auditing and certifying an Identity provider's identity, credential, and account management policies and practices consistent with the present invention.

FIG. 7 is a flowchart depicting an exemplary process for auditing and certifying an applicant organization consistent with the present invention. Before an applicant to the federation is admitted and certified, an audit of the applicant organization's infrastructure and policy adherence scheme may be conducted. Such an audit may be performed by trusted third party 300, an approved third-party auditor, or any other entities capable of evaluating identity management compliance. An audit may focus on an applicant organization's procedures for proofing and vetting of a user's identity prior to being issued credentials for a login and whether such procedures meet the standards set forth by the federation (step 700). Procedures may include, for example, investigating what forms of identification must be provided by a user, how the provided identification documents are stored by the applicant organization, what methods are used to ensure the identification documents are authentic (e.g., contacting a license bureau or bank), and whether a background check was performed. Determining the methods for identity verification may be important for ensuring that a particular user is who he claims to be and has not provided fraudulent documents. For example, where federation policies and procedures indicate that a user's identification documents must be stored securely at an off-site location, auditors may request access to the off-site location so that existing identification documents may be compared with active user accounts in applicant organization's user credential store. Such comparison information may be provided in an audit report and may be valuable for determining whether an applicant organization is in compliance with the policies and procedures of the federation.

An audit may also investigate the methods by which user credentials are generated and bound to a user (step 705). Credential binding may include, for example, the generation of unique information and binding of such unique information to a vetted identity (i.e., ensuring a users credentials are linked to the matched identity). In one embodiment, policies and procedures of the federation may require credentials be bound to a user via biometric data. In such an embodiment, credentials may be generated including a unique identifier and password associated with a particular user. In addition, biometric data such as an iris scan or thumbprint may be provided by the user to be associated with the unique identifier and password. An audit may investigate the unique information and password generation process as well as methods for obtaining, storing, and validating the biometric data. This information may be provided in an audit report and may be used for determining whether an applicant organization is in compliance with the policies and procedures of the federation.

An audit of an applicant organization may also focus on credential protection (step 710). The process of auditing methods for protecting credential information may include, for example, review of username/password generation requirements (e.g., number of characters and composition), methods for storing additional user-unique information (e.g., biometric data), and methods for securing and storing private keys. For example, policies and procedures of the federation may require that private keys be encrypted and accessible only by users with administrative privileges. Investigation of certificate store 455 may reveal the current storage method for private keys at the applicant organization. This information may be provided in an audit report and may be used for determining whether an applicant organization is in compliance with the policies and procedures of the federation.

Auditing for admission to a federation may also require investigation of attribute proofing methods at an applicant organization (step 715). Proofing of attribute information may require similar methods to those required for proofing of identity of a user (step 700). Required user attributes may be defined by policies and procedures of the federation. For example, a user's citizenship may be a required attribute to determine a user's country of origin. Methods for validating a user's citizenship may include, for example, background investigations, presentation of a current passport, and presentation of a birth certificate and driver's license. An audit may reveal deficiencies or compliance and such information may be provided in an audit report and may be used for determining whether an applicant organization sufficiently complies with the policies and procedures of the federation.

Auditing of an organization's account revocation policy may also be undertaken (step 720). Account revocation policies may dictate at what time a user account should be denied access to resources based on predefined factors. For example, a user who has terminated employment with an applicant organization may be required to have associated credentials disabled or removed from user credential store 460. In another example, users who have utilized company computer resources for prohibited activities (e.g., downloading copyrighted material) may also be denied access to resources based on federation policies and procedures. Auditing methods may include, for example, comparing a current employee listing with a listing of currently active user credentials in user store 460 and reviewing security and access logs to a determine whether account revocation policies are actively enforced at the applicant organization. Such information may be provided in an audit report and may be used for determining whether an applicant organization is in compliance with the policies and procedures of the federation.

Following an audit of an applicant information, an audit report detailing the results of the investigation performed may be submitted and a determination as to compliance may be made by trusted third party 300 (step 725). The audit report may be evaluated for compliance by manual review, or alternatively, such a report may be evaluated by application server 410 or other automated means. Where an applicant organization fails to meet the criteria set forth in the policies and procedures of the federation, that organization may be denied admission to the federation. A copy of the audit report may be given to the organization in order that the organization may further modify internal practices to comply with the policies and procedures of the federation.

Where an audit report indicates an organization meets the requirements of the policies and procedures for the federation, a legal agreement may be executed between the applicant organization and trusted third party 300 indicating, among other things, a willingness to continue to comply with the federation policies and procedures (step 730). Such a legal agreement may be a boilerplate form created by Legal/Audit working group 615. Alternatively, the agreement may be negotiated and drafted with the assistance of legal counsel from both the applicant organization and trusted third party 300. The agreement may include, for example, terms related to auditing in the event of a breach, remedy in the event of breach, technical interoperability, and indemnification of trusted third party 300 for harm caused by an applicant organization's breach of policy. Additionally, the agreement may contain other terms including, for example, creating an obligation on the part of the applicant organization to implement technical standards consistent with the policies and procedures of the federation, to submit to an audit at any time, to transmit transaction data to trusted third party 300 for audit purposes, and to pay a sum of money into an escrow account for reimbursement following a breach of policy. Execution of the agreement may then enable the applicant organization to become a federation member operating as an identity provider and/or a service provider. One of skill in the art will recognize that additional terms or agreements may be made between the applicant organization, trusted third party 300, and other federation members depending on factors important to particular communities of interest. Development, procurement, and enforcement of such agreements are meant to fall within the scope of the present invention.

Once relevant agreements have been executed, the newly joined federation member may provide the public component of a public/private key pair, to trusted third party 300 for generation of an identifying artifact (e.g., digital certificate). An identifying artifact may serve to indicate the approval from trusted third party 300 of the federation member's identity, credential, and account management policies and practices. Trusted third party 300 may require that a new public/private key pair be generated by the federation member before providing the public key component to trusted third party 300 for digital certificate generation by trusted third party 300. Alternatively, a preexisting public/private key pair may be utilized by federation member. Where encryption of a private key is specified in the federation policies and procedures, such as when the key is being escrowed by the trusted third party, encryption methods for the new private key may be utilized by the federation member. Alternatively, no encryption may be required when generating the new private key. Further, policies and procedures of the federation may require the private key be generated using a particular bit size (e.g., 1024-bit).

Once the public key associated with the federation member's private key has been provided to trusted third party 300, trusted third party 300 may generate a digital certificate binding the provided public key within the digital certificate data structure (e.g., X.509). The digital certificate data structure may indicate federation member has undergone trusted third party's audit process and has been approved by trusted third party 300 (step 735). The generated digital certificate data structure may contain information including, for example, the federation member's public key, date/time information related to validity of the digital certificate (i.e., for what time period is the digital certificate valid), and issuer's identity (e.g., trusted third party 300). The certificate may also contain attributes that were certified by the trusted third party and are specific to the certified Identity provider or a particular federation profile. Once the digital certificate has been issued, federation member may use the private key, associated with the public key contained in the digital certificate issued by trusted third party 300, to digitally sign identity assertions containing identity attributes related to a user making a request for resource access. The validity of each attribute may be trusted based on the transitive trust established through the audit and legal agreement processes provided by trusted third party 300. The process of digitally signing an identity assertion will be discussed in greater detail with reference to FIG. 8.

Each service provider requires access to the identity provider's digital certificate. In one embodiment, the issued digital certificate may be provided to each federation member and stored within certificate store 455, similar to methods for distributing and storing the root certificate of trusted third party 300. Alternatively, the digital certificate may be provided to a service provider on a per-request basis as a part of the communication initialization process or following establishment of a communication session with the service provider. Other methods of providing digital certificates to federation members may be available in the art and fall within the scope of the present invention.

One of skill in the art will recognize that the order in which the audit steps are performed is irrelevant and steps performed in any order will remain within the scope of the invention. For example, an audit may focus on an organization's account revocation policy, followed by credential protection, etc. Such a change may not affect the outcome of the audit.

Figure 8:
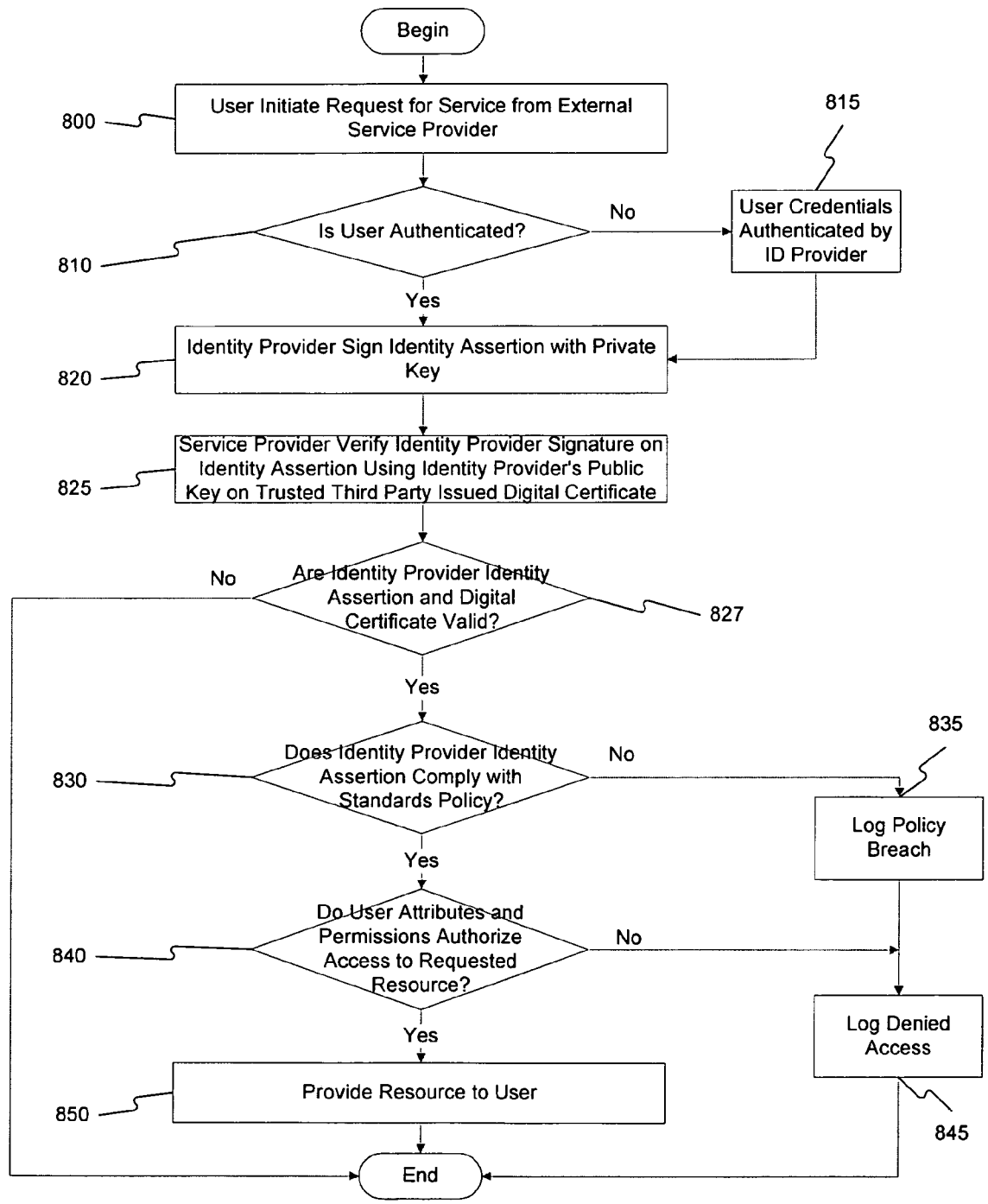
FIG. 8 is a flowchart depicting an exemplary technical implementation of federated single sign-on consistent with an embodiment of the present invention.

FIG. 8 is a flowchart depicting an exemplary technical implementation of a federated identity architecture consistent with an embodiment of the present invention. Initially a user from an organization within the federation referred to as an identity provider, may request services provided by a different organization within the federation, referred to as a service provider (step 800). For example, an employee of "Organization A," a manufacturer of top-secret widgets, may wish to view available internal guidance systems provided by "Organization B," a manufacturer of top-secret gyroscopic guidance devices. The employee may initiate a request to access the resources made available at Organization B using for example, a web browser, client/server application, or any other means by which Organization B has enabled access to the resources.

Following the initiation of a request for resources, identity provider may determine if the requesting user has been authenticated within the identity, credential, and account management policies and practices of the identity provider (step 810). To be authenticated, a user may be required to have been proofed and vetted in accordance with the policies and procedures defined by the federation. Further, an account provisioned through the identity provider and secured by credential parameters defined by policies and procedures of the federation may be created. A previously authenticated user may not be required to provide credential information. Alternatively, credential information may be required at any time a request for resources is made. A request from a user not previously authenticated, or where credential information is required for any resource request, may require credential information (e.g., username, password, and biometric data) and authentication by the identity provider (step 815). A user may provide credential information via methods including, for example, challenge and response (e.g., supplying credentials when challenged), pass-through security (e.g., relying on local computer login credentials), and biometric data transmission (e.g., a thumbprint scanner). Storage and authentication of user credentials (step 815) may be performed by credential server 450. Alternatively, storage and authentication of user credentials may be performed by any other server configured for performing such tasks.

Following successful authentication of a requesting user, identity provider may generate, sign, and transmit to the service provider, an identity assertion data structure together with the user request (step 820). To generate an identity assertion, identity provider may access user attributes stored in user credential store 460 and assemble into a data structure as defined by the policies and procedures of the federation. For example, where the policies and procedures of the federation dictate that an identity assertion data structure shall include information related to a user's name, date of birth, citizenship, and affiliation, identity provider may retrieve only the attribute fields "name," "date of birth," "citizenship," and "affiliation" from user credential store 460 to generate the identity assertion. User credential store 460 may contain data fields correlating to required data fields, but may be named differently. For example, a data field in user credential store 460 may be named "nationality" instead of "citizenship." In such a situation, identity provider may perform mapping functionality for translating the nationality field into the citizenship field. Alternatively, identity provider may transmit the identity assertion data structure to trusted third party 300 in order to have such data mapping performed based on federation member naming conventions. Data mapping may also be performed at the service provider depending on the configuration of the federation. The identity assertion data structure may be generated using Security Assertion Markup Language (SAML), alternatively, any format, syntax, schema, or protocol known in the art may be used. Translation between disparate formats, syntaxes, schemata, or protocols may be provided by application server 410 at trusted third party 300. Alternatively, translation between disparate protocols may be performed at the identity provider or the service provider. In another embodiment, disparate protocol use may be prohibited and a standard protocol mandated by the federation policies and procedures.

Once the data structure comprising the identity assertion has been generated, an identity provider may digitally sign the identity assertion, or, alternatively, provide some other mechanism for non-repudiation. A digital signature is used to verify that a message or document was authored by a particular known entity, and that it was not altered or modified by any other entity following its transmission. The digital signature also signals the identity provider's intention that the assertion should be deemed compliant with the published policy whose compliance is certified by the trusted third party. Digital signatures may be used alone or together with encryption in order to provide maximum security. Optionally, the certificate associated with the private key that was used to digitally sign the assertion may be attached to the assertion. The identity provider may also signal compliance with the certified policy by using its issued digital certificate in other ways, such as by presenting that certificate during establishment of an encrypted session. The identity provider may retrieve its private key from certificate store 455 or other storage location and then digitally sign the identity assertion using, for example, the digital signature algorithm (DSA). Alternatively, other digital signature methods known in the art may be used including, for example, MD5, SHA-1, and elliptic curve DSA (ECDSA). Identity provider may then transmit the identity assertion and resource request to the service provider. Additionally, where transaction monitoring has been implemented within a federation, identity provider may transmit information related to the identity assertion and request to transaction server 445 which may transmit the data to audit server 405 at trusted third party 300. Alternatively, transaction server 445 may store the data for future access by audit server 405 at trusted third party 300. One of skill in the art will recognize that other methods for monitoring and storing transaction data may be implemented and remain within the scope of the present invention.

In another embodiment, identity provider may encrypt an identity assertion and resource request using the public key of the service provider for whom the request is intended. Encryption of identity assertions may be required by the policies and procedures of the federation, or may be an additional security measure put in place by identity provider. In such a situation the identity provider may access the public key certificate associated with the service provider from certificate store 455. Alternatively, public key certificates for federation members may be stored and retrieved from any server configured to perform such operations. Upon retrieving the public key associated with the service provider, the signed identity assertion and resource request may be encrypted using methods known in the art, and transmitted, via the network, to the service provider. One of skill in the art will recognize that encryption may be utilized alone or in tandem with digital signature methods.

Following the signing and transmission of an identity assertion, a service provider may receive and attempt to verify the identity assertion and user request (step 825). Verification of the identity assertion may consists of steps including, for example, determining if the digital certificate issued by trusted third party 300 for the identity provider is valid (step 827); determining if the identity assertion complies with policies and procedures of the federation (step 830); determining whether the attributes provided in the identity assertion support authorization of the user to access the requested resource (step 840); and confirming that information about the federation policy encoded in the certificate is accurately represented in the assertion. In addition, reception of an identity assertion and request may cause the service provider to transmit transaction-related data to audit server 405 at trusted third party 300, or the service provider may store transaction related information locally (e.g., on transaction server 445) for future auditing or other purposes. Multiple functions may be carried out in order to determine the validity of the digital certificate issued by trusted third party 300 for the identity provider. The digital certificate data structure may contain date information indicating the period for which the digital certificate is valid and such information may be compared with the current date to determine if the digital certificate is expired. Further, the service provider may access a certificate revocation list (CRL) listing all revoked digital certificates within the federation. The CRL may be maintained by trusted third party 300 at trusted third party 300 and made accessible via the Internet or other method. A service provider accessing the CRL may determine the validity of a digital certificate purporting to have been issued by trusted third party 300. Where a digital certificate exists within the CRL, that digital certificate may not be relied upon for any reason. Other methods for digital certificate validation consistent with the present invention may also be used, for example, online certificate status protocol (OCSP).

Following validation of a digital certificate associated with an identity provider, the service provider may parse the identity assertion to determine if it complies with the policies and procedures of the federation (step 830). Additional validation may include extraction of certified attributes from the digital signing certificate, and comparison of those attributes to a set of attributes contained in the assertion. If the identity assertion has been encrypted using the public key of the service provider, parsing of the identity assertion may require decryption using the service provider's private key. Methods for authorized decryption of encrypted data are well known in the art and use of any such method is consistent with embodiments of the present invention. The private key signature of the identity provider, which was used to sign the identity assertion, must also be verified by the service provider prior to assessing validity of attributes, in order to ensure that the identity assertion is accurate and unmodified. The public key from identity provider's digital certificate is used for determining that the signature and identity assertion are authentic. Methods associated with validation of digital signatures are specific to the digital signature algorithm used (e.g., DSA, MD5, ECDSA, SHA-1) and are well known in the art. Use of any such method is consistent with embodiments of the present invention.

Once the signature is verified, the data structure of the identity assertion may be assessed for compliance with the policies and procedures of the federation. For example, where the policies and procedures of the federation dictate that an identity assertion must contain a user's name, date of birth, citizenship, and affiliation, data for each of the stipulated fields may be provided, in a like-named or correlated field, in the identity assertion data structure. In the event that the identity assertion data structure is incomplete or incorrect, a breach of policy may be logged (step 835) followed by a denial of access (step 845). Logging of the breach may take place on service providers transaction server 445. Alternatively, logging of the breach of policy may be transmitted by the service provider directly to audit server 405 at trusted third party 300. One of skill in the art will recognize that other methods for logging a breach of policy may be utilized and remain within the scope of the present invention. For example, logging of information related to a breach of policy may take place on any computer configured to perform such logging.

If an identity assertion data structure is determined to comply with the policies and procedures of the federation, the service provider may assess the user credentials to determine if the requesting user is privileged to access the requested resource (step 840). Each individual attribute may be trusted for purposes of determining access to a resource. For example, a user with an affiliation of "secret clearance" may not be permitted to view resources designated as top-secret. Where the user has requested access to view top-secret internal guidance systems marked for access by users affiliated with "top-secret clearance," and the user has only an affiliation attribute of "secret clearance," service provider may deny access to the resource and log the denial (step 845). In another example, employees under the age of 65 may not be permitted to access current retirement benefit information (e.g., pension information). A user with a date of birth attribute indicating an age younger than 65 requesting access to current retirement benefit information may be denied access based solely on date of birth. Additionally, multiple attributes may be relied on within the identity assertion for determining access to a resource. For example, a user requesting access to current retirement benefits may be younger than 65, but have an affiliation attribute equivalent to an administrator. In such a case, service provider may trust the identity assertion that the user is an administrator of the retirement benefits program and grant access, regardless of the age attribute (step 850).

Figure 9:
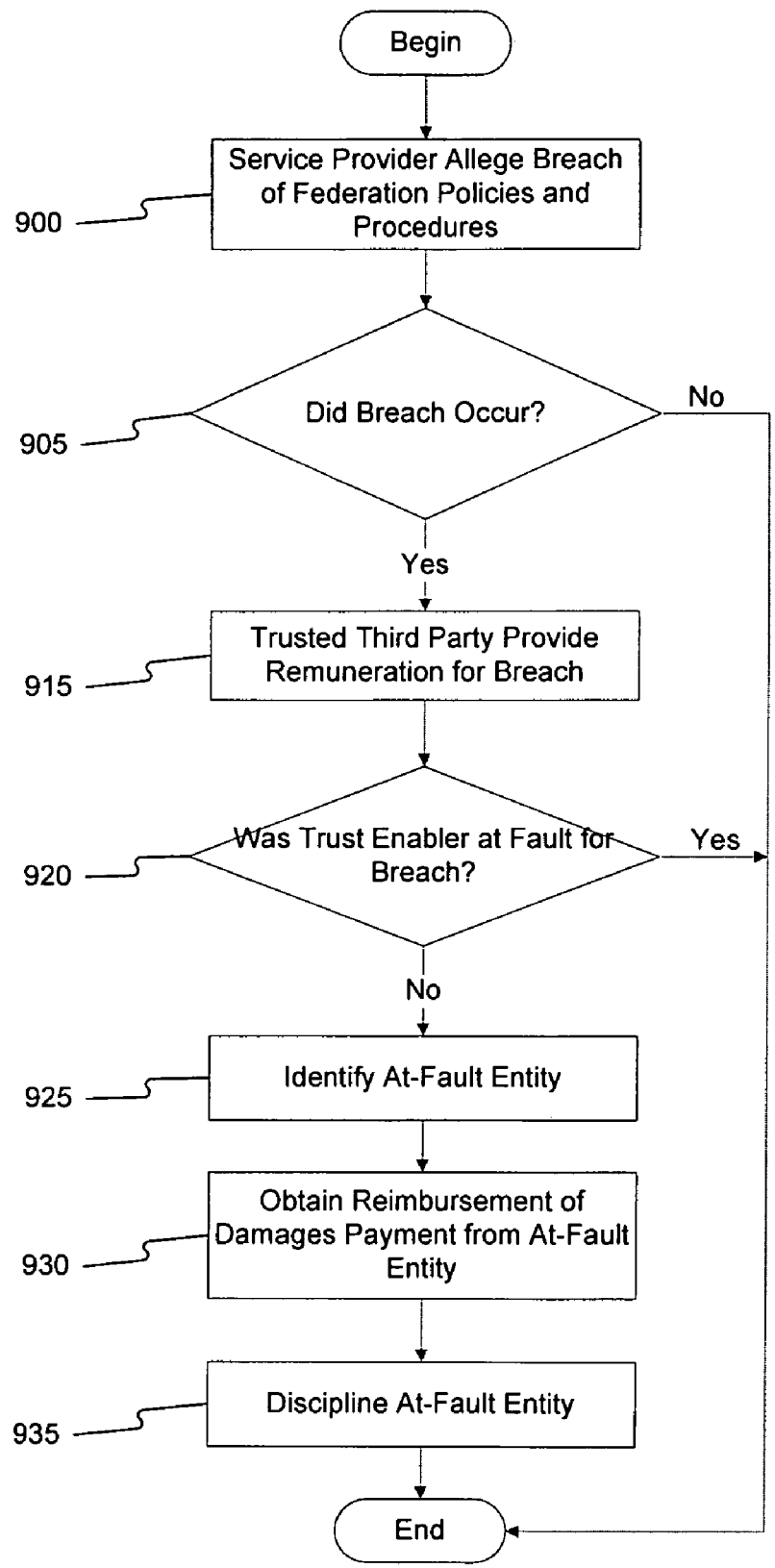
FIG. 9 is flowchart demonstrating an exemplary process for determining responsibility for a breach of policy and providing a remedy to a federation member consistent with an embodiment of the present invention.

FIG. 9 is flowchart demonstrating an exemplary process for determining responsibility for a breach of policy and providing a remedy to a federation member consistent with an embodiment of the present invention. Where a service provider is aware of any breach of federation policies and procedures, the service provider may allege a breach to trusted third party 300 (step 900). Such a breach may occur for reasons including, for example, receipt of a non-conforming identity assertion, failure to proof identity, failure to maintain an accurate CRL, and failure to disable terminated employee's credentials. Multiple methods and locations for breach determination may be available. For example, credential server 450 at the service provider may determine that a received identity assertion is incorrectly constructed. This may cause credential server 450 to notify transaction server 445 which may generate an audit flag e-mail to be sent to a system administrator. In another embodiment, audit server 405 at trusted third party 300, may determine a breach has occurred based on transaction information transmitted from transaction server 445 at service provider. One of skill in the art will recognize that many methods for determining a breach of federation policies and procedures exists and are within the scope of the present invention.

Once a breach has been alleged, trusted third party 300 may investigate whether a breach did indeed occur (step 905). Such an investigation may include, for example, determining whether the allegations of breach are the result of a breach of federation policies, review of logs created by audit server 405, review of information received by the service providers transaction server 445 and credential server 465, and review of logs created by the identity provider's transaction server 445' and credential server 465'. For example, the service provider may allege that an identity assertion was received from the identity provider and the identity assertion data structure was missing particular attributes. Therefore, the identity assertion was not in compliance with the federation policies. Upon review of the identity provider's transaction server logs, trusted third party 300 may determine that the identity assertion transmitted by identity provider contained the required attributes, but the service provider failed to map the attributes. Therefore, no breach occurred and the service provider may not be entitled to receive damages as per the federation agreements. Alternatively, the review may reveal that the required attributes were missing and a breach of policies did occur.

In another example, a service provider may allege a breach of policy due to unauthorized access to resources by a former employee of an identity provider. The service provider may allege that the identity provider has not maintained credentials upon termination of employees. Based on the level of harm, the service provider may seek a monetary remedy as may be provided in the federation agreements. For example, where an unauthorized user has gained access to the service provider's resources, the service provider may incur liability to other users of the resources and may be entitled to indemnification and punitive damages under the terms of the federation agreement. The trusted third party may review such an allegation in order to determine if a breach of federation policy has occurred (step 905). Such a review may require trusted third party 300 to take actions including, for example, reviewing the identity provider's employee payroll data, reviewing transaction logs maintained on identity provider's transaction server 445, and reviewing transaction logs maintained on audit server 405. Upon conclusion of such a review, trusted third party 300 may determine that the identity provider had breached federation policy in failing to disable credentials of terminated employees. The trusted third party may then pay damages, as may be specified in the federation agreement, to the service provider (step 915).

Following payment of damages to the service provider, trusted third party 300 may then initiate additional investigation into fault for the breach of federation policies (step 920). The trusted third party may initially look to its own logs and records to determine if the fault lies internally. For example, trusted third party 300 may provide access to CRLs enabling a service provider to check each digital certificate (e.g., X.509) for validity when receiving a request for resources. If trusted third party 300 determines that the CRL process had malfunctioned rendering the CRL unavailable or inaccurate, trusted third party 300 may determine that it was at fault for the breach. Trusted third party 300 may then assume responsibility for the breach and perform no further investigation related to the breach. Alternatively, trusted third party 300 may investigate its own internal procedures for remediation.

Where trusted third party 300 determines fault for the breach of policies lies with an entity other than trusted third party 300, an investigation may be initiated to determine the root cause of the failure and the at-fault party (step 925). Once again, trusted third party 300 may take actions including, for example, reviewing logs on audit server 405; reviewing logs on transaction server 445 at the identity provider; re-auditing the identity provider alleged to have breached, as described in greater detail with reference to FIG. 7; and other actions allowable under the terms of the federation agreement. In one example, trusted third party 300 may discover that an identity provider had failed meet the standards required when proofing identities of users based on identity provider records reviewed during a re-audit process conducted at the identity provider premises. Trusted third party 300 may then determine that the identity provider was at fault for the breach of federation policy.

Following determination of the entity at-fault for the breach of federation policy, trusted third party 300 may seek to obtain reimbursement for payment of damages to the injured service provider, as provided in the federation agreement (step 930). In one embodiment, an identity provider may simply accept responsibility for the breach and reimburse trusted third party 300 upon being notified. In another embodiment, legal proceedings may be initiated in order to enforce the legally binding agreement signed by the identity provider upon admission to the federation. In yet another embodiment, where a sum of money has been paid into escrow by an identity provider upon joining the federation, reimbursement may be extracted from the money in the identity provider's escrow account. Alternatively, trusted third party 300 may determine, for example, where damages were minimal, that no reimbursement should be made.

The trusted third party may then take disciplinary action against the entity at fault for the breach of federation policy (step 935). Disciplinary action may be based on terms specified in the federation agreement and may take forms including, for example, expulsion from the federation (e.g., revocation of the digital certificate), limited access to resources within the federation, imposition of additional security measures, and a complete re-auditing of the identity provider. Alternatively, trusted third party 300 may determine that no disciplinary action is required.

Using methods and systems consistent with the present invention, access to multiple resources across organizational borders may be granted based on a single sign-on to an identity provider possessing user credentials associated with user attributes. A federated security architecture where trust is explicit and multilateral may be operated based on legally binding agreements between trusted third party 300 and business entities who have been audited and comply with the policies and procedures of trusted third party 300. Such a system allows service providers to evaluate each security attribute contained in an identity assertion individually for determining whether access to a particular resource should be granted. Because the service provider trusts trusted third party 300, and trusted third party 300 in turn trusts the identity provider, the service provider may trust the identity assertions of the identity provider.

Other embodiments of the invention will be apparent to those skilled in the art from consideration of the specification and practice of the invention disclosed herein. For example, the federation architecture may be applied to individual consumers desiring single sign-on to multiple web resources. In such a situation, an identity provider within a federation may be an Internet Service Provider (ISP), who in turn vouches for all users subscribing to Internet service. The ISP may advertise significant value added by enabling users access to partnering service providers with a single sign-on. Trusted third party may audit the ISP to ensure compliance with the federation policies and procedures and the ISP may agree to provide remedy in the event of a breach by one of its subscribers. One or more steps in the processes described may be omitted and/or the steps may be performed in different orders from that described herein.

It is intended that the specification and examples be considered as exemplary only, with a true scope and spirit of the invention being indicated by the following claims.

We claim:

1. A computer-implemented method for communicating over a federated network, the method comprising:
   receiving, by an identity-providing computing device associated with an identity provider, an indication of a request by a requester for access to a resource of a service provider associated with a service-provider computing device;
   transmitting, by the identity-providing computing device, a digital public key to a trusted third-party computing device associated with a trusted third party of the identity provider and the service provider;
   receiving, by the identity-providing computing device, a digital certificate from the trusted third-party computing device, the digital certificate indicating that the trusted third party has audited and approved policies of the identity provider for compliance with policies of the trusted third party for communicating on the federated network,
   wherein the digital certificate contains a digital private key associated with the provided digital public key;
   responsive to a determination that a trust relationship exists, specifying, by the identity-providing computing device, an identity-assertion data structure defined by the third party policy, the identity-assertion data structure comprising at least one attribute associated with the requester;
   associating, by the identity-providing computing device, the identity-assertion data structure with the request;
   digitally signing, by the identity-providing computing device, the identity-assertion data structure using the associated digital private key contained in the received digital certificate; and
   transmitting, by the identity-providing computing device, the digitally-signed identity-assertion data structure to the service-provider computing device.

2. The method of claim 1, wherein the digitally-signed identity-assertion data structure comprises:
   a first data structure comprising the attribute associated with the identity provider; and
   a second data structure comprising the request.

3. The method of claim 1, wherein the trust relationship is determined by authentication of an authentication element.

4. The method of claim 3, wherein the authentication element comprises at least one of an assertion, a claim, a token, or a credential.

5. The method of claim 3, wherein authentication includes an exchange of the authentication element between the identity-providing computing device and the service-provider computing device.

6. The method of claim 1, wherein the step of digitally signing the identity-assertion data structure comprises applying, by the identity-providing computing device, a digital signing algorithm based on the digital private key to the identity-assertion data structure.

7. The method of claim 6, wherein the step of digitally signing the identity-assertion data structure further comprises encrypting, by the identity-providing computing device, the identity-assertion data structure.

8. The method of claim 1, wherein the policy for operating the federated network is based on a published standard.

9. The method of claim 1, wherein the identity-assertion data structure is created using an attribute conveyance format.

10. The method of claim 9, wherein the attribute conveyance format is Security Assertion Markup Language.

11. An identity-providing computing system associated with an identity provider for providing communicating over a federated network, the system comprising:
   a communication device;
   a memory device storing computer-executable instructions; and
   a processor configured to execute the instructions to cause the identity-providing computing system to:
      receive an indication of a request by a requester to access a resource of a service-provider computing device associated with a service provider;
      transmit, via the communication device, a digital public key to a trusted third-party computing device associated with a trusted third party of the identity provider and the service provider;
      receive, via the communication device, a digital certificate from the trusted third-party computing device, the digital certificate indicating that the trusted third party has audited and approved policies of the identity provider for compliance with policies of the trusted third party for communicating on the federated network,
      wherein the digital certificate contains a digital private key associated with the provided digital public key;
      specify, responsive to a determination that a trust relationship exists, an identity-assertion data structure defined by the third-party policy, the identity-assertion data structure comprising at least one attribute associated with the requester;
      associate the identity-assertion data structure with the request;
      digitally sign the identity-assertion data structure using the associated digital private key contained in the received digital certificate; and
      transmit, via the communication device, the digitally-signed identity-assertion data structure to the service-provider computing device over the network.

12. The identity-providing computing system of claim 11, wherein the digitally-signed identity-assertion data structure comprises:
   a first data structure comprising the attribute associated with the identity provider; and
   a second data structure comprising the request.

13. The identity-providing computing system of claim 11, wherein the processor is further configured to execute the instructions to cause the identity-providing computing system to determine existence of the trust relationship by authentication of an authentication element.

14. The identity-providing computing system of claim 13, wherein the authentication element comprises at least one of an assertion, a claim, a token, or a credential.

15. The identity-providing computing system of claim 13, wherein authentication includes an exchange of the authentication element between the identity-providing computing system and the service-provider computing device.

16. The identity-providing computing system of claim 11, wherein the processor is further configured to execute the instruction to cause the identity-providing computing system to:
   perform the digital signing by applying a digital signing algorithm based on the digital private key to the identity-assertion data structure.

17. The identity-providing computing system of claim 16, wherein the processor is further configured to execute the instructions to cause the identity-providing computing system encrypt the identity assertion data structure.

18. The identity-providing computing system of claim 11, wherein the policy for communicating on the federated network is based on a published standard.

19. The identity-providing computing system of claim 11, wherein the processor is further configured to execute the instructions to cause the identity-providing computing system to create the identity-assertion data structure using an attribute conveyance format.

20. The identity-providing computing system of claim 19, wherein the attribute conveyance format is Security Assertion Markup Language.

21. A non-transitory computer-readable storage medium storing instructions which, when executed by an identity-providing computing device associated with an identity provider, cause the identity-providing computing device to perform a method for communicating over a federated network, the method comprising:
   receiving an indication of a request by a requester to access a resource of a service provider associated with a service-provider computing device;
   transmitting a digital public key to a trusted third-party computing device associated with a trusted third party of the identity provider and the service provider;
   receiving a digital certificate from the trusted third-party computing device, the digital certificate indicating that the trusted third party has audited and approved policies of the identity provider for compliance with policies of the trusted third party for communicating on the federated network,
   wherein the digital certificate contains a digital private key associated with the provided digital public key;
   responsive to a determination that a trust relationship exists, specifying an identity-assertion data structure defined by the third-party policy, the identity-assertion data structure comprising at least one attribute associated with the requester;
   associating the identity-assertion data structure with the request;
   digitally signing the identity-assertion data structure using the associated digital private key contained in the received digital certificate; and
   transmitting the digitally-signed identity-assertion data structure to the service-provider computing device.

22. A computer-implemented method for communicating over a federated network, the method comprising:
   determining, by an identity-providing computing device associated with an identity provider, credentials associated with a requester requesting access to a resource of a service provider associated with a service-provider computing device;
   transmitting, by the identity-providing computing device, a digital public key to a trusted third-party computing device associated with a trusted third party of the identity provider and the service provider;

receiving, by the identity-providing computing device, a digital certificate from the trusted third-party computing device, the digital certificate indicating that the trusted third party has audited and approved policies of the identity provider for compliance with policies of the trusted third party for communicating on the federated network, wherein the digital certificate contains a digital private key associated with the provided digital public key;

creating, by the identity-providing computing device, a first data structure comprising an identity-assertion defined by the third-party policy, wherein the first data structure comprises at least one attribute associated with the credentials;

associating, by the identity-providing computing device, the first data structure with a second data structure containing the request for access to the resource of the service provider;

digitally signing, by the identity-providing computing device, a set comprising the first data structure and second data structure using the associated digital private key contained in the received digital certificate, to yield a resulting digitally-signed identity-assertion data structure;

providing, by the identity-providing computing device, the digitally-signed identity-assertion data structure to the service-provider computing device via the network; and receiving, by the identity-providing computing device, the requested resource via the network from the service-provider computing device, wherein the service-provider computing device transmits the requested resource based on a first trust relationship between the service provider and the trusted third party and on a second trust relationship between the trusted third party and the identity provider.

23. The method of claim 22, wherein determining credentials comprises authenticating the requester.

24. The method of claim 22, wherein the first data structure is created using an attribute conveyance format.

25. The method of claim 24, wherein the attribute conveyance format is Security Assertion Markup Language.

26. The method of claim 22, wherein the attribute is required by the third-party policy for communicating on the federated network.

27. The method of claim 22, wherein the third-party policy for communicating on the federated network is defined by the trusted third party.

28. The method of claim 22, wherein the step of digitally signing the set comprises applying a digital signing algorithm to the identity-assertion data structure based on the digital private key.

29. The method of claim 28, further comprising encrypting the resulting digitally-signed identity-assertion data structure.

30. The method of claim 28, wherein the digital certificate specifies requirements related to the first data structure.

31. The method of claim 28, wherein the third-party policy specifies a size for the digital private key.

32. An identity-providing computing system associated with an identity provider for communicating over a federated network, the system comprising:
a communication device;
a memory device storing computer-executable instructions; and
a processor configured to execute the instructions to cause the identity-providing computing system to:
determine credentials associated with a requester requesting access to a resource from a service-provider computing device associated with a service provider;
transmit, via the communication device, a digital public key to a trusted third-party computing device associated with a trusted third party of the identity provider and the service provider;
receive, via the communication device, a digital certificate from the trusted third-party computing device, the digital certificate indicating that the trusted third party has audited and approved policies of the identity provider for compliance with policies of the trusted third party for communicating on the federated network,
wherein the digital certificate contains a digital private key associated with the provided digital public key;
create a first data structure comprising an identity assertion defined by the third-party policy, wherein the first data structure comprises at least one attribute associated with the credentials;
group the first data structure with a second data structure containing the request for access to the resource of the service provider;
digitally sign the group comprising the first data structure and second data structure using the associated digital private key contained in the received digital certificate, to yield a resulting digitally-signed identity-assertion data structure;
transmit, using the communication device, the resulting digitally-signed identity-assertion data structure to the service-provider computing device via the network; and
receive, via the communication device, the requested resource via the network from the service-provider computing device, wherein the service-provider computing device transmits the requested resource based on a first trust relationship between the service provider and the trusted third party and on a second trust relationship between the trusted third party and the identity provider.

33. The identity-providing computing system of claim 32, wherein the first data structure is created using an attribute conveyance format.

34. The identity-providing computing system of claim 33, wherein the attribute conveyance format is Security Assertion Markup Language.

35. The identity-providing computing system of claim 32, wherein the attribute is required by the third-party policy for communicating on the federated network.

36. The identity-providing computing system of claim 32, wherein the processor is further configured to execute the instructions to cause the identity-providing computing system to:
apply a digital signing algorithm, based on the digital private key, to the group comprising the first data structure and second data structure to yield the resulting digitally-signed identity-assertion data structure.

37. The identity-providing computing system of claim 36, wherein the processor is further configured to execute the instructions to cause the identity-providing computing system to encrypt the resulting digitally-signed identity-assertion data structure.

38. The identity-providing computing system of claim 36, wherein the digital certificate specifies requirements related to the first data structure.

39. The identity-providing computing system of claim 36, wherein the third-party policy for communicating on the federated network specifies a size for the digital private key.

40. A non-transitory computer-readable storage medium storing code that, when executed by an identity-providing computing device associated with an identity provider, causes the identity-providing computing device to perform a method for communicating over a federated network, the method comprising:

determining credentials associated with a requester requesting access to a resource of a service provider associated with a service-provider computing device;

transmitting a digital public key to a trusted third-party computing device associated with a trusted third party of the identity provider and the service provider;

receiving a digital certificate from the trusted third-party computing device, the digital certificate indicating that the trusted third party has audited and approved policies of the identity provider for compliance with policies of the trusted third party for communicating on the federated network, wherein the digital certificate contains a digital private key associated with the provided digital public key;

creating a first data structure comprising an identity assertion consistent with the third-party policy for communicating on the federated network, wherein the first data structure comprises at least one attribute associated with the credentials;

associating the first data structure with a second data structure containing the request for the resource of the service provider;

digitally signing, using the associated digital private key contained in received digital certificate, a set comprising the first data structure and second data structure to yield a resulting digitally-signed identity-assertion data structure;

providing the digitally-signed identity-assertion data structure to the service-provider computing device via the network; and receiving the requested resource via the network from the service-provider computing device, wherein the service-provider computing device transmits the requested resource based on a first trust relationship between the service provider and the trusted third party and on a second trust relationship between the trusted third party and the identity provider.

41. A method for enabling transitive trust in a federated network configuration including an identity-provider computing associated with an identity provider and a service-provider computing device associated with a service provider, the method comprising:

developing, by actions of a trusted third party of the identity provider and the service provider, policies related to operating the federated network configuration, wherein the policies include procedures for:

associating, by the identity-provider computing device, attributes of a requester with a request to access to a resource of the service provider computing device;

transmitting, by the identity-providing computing device, a digital public key to a trusted third-party computing device associated with the trusted third party;

receiving, by the identity-providing computing device, a digital certificate from the trusted third-party computing device, the digital certificate being issued to the identity provider by the trusted third party and indicating that the trusted third party has audited and approved policies of the identity provider for compliance with policies of the trusted third party for communicating on the federated network, wherein the digital certificate contains a digital private key associated with the provided digital public key;

responsive to a determination that a trust relationship exists, specifying, by the identity-providing computing device, an identity-assertion data structure defined by the third-party policy, the identity-assertion data structure including the attributes;

digitally signing, by the identity-providing computing device, the identity-assertion data structure using the associated digital private key contained in the received digital certificate;

transmitting, by the identity-providing computing device, the digitally-signed identity-assertion data structure to the service provider computing device;

transmitting the requested resource, by the service-provider computing device, to the identity-providing computing device based on a first trust relationship established between the service provider and the trusted third party and on a second trust relationship established between the trusted third party and the identity provider;

granting access to the third-party policy for communicating on the federated network;

auditing an applicant to the federated network configuration for compliance with the policy; and issuing a digital certificate to the applicant based on a result of the audit.

42. A computer-implemented method for communicating on a federated network including a service-provider computing device associated with a service provider and an identity-provider computing device associated with an identity provider, the method comprising:

receiving, by the service provider-computing device, a digitally-signed identity-assertion data structure from the identity-provider computing device including a request to access a resource of the service-provider and at least one attribute associated with the requester, the data structure signed using digital private key contained in a digital certificate received by the identity-provider computing device from a trusted third-party computing device associated with a trusted third party of the identity provider and the service provider, the digital certificate indicating that the trusted third party has audited and approved policies of the identity provider for compliance with policies of the trusted third party for communicating on the federated network;

determining, by the service-provider computing device, whether the digital certificate issued to the identity provider complies with the policies of the trusted third party for communicating on the federated network;

parsing, by the service-provider computing device, the identity-assertion data structure to determine whether the content of the identity-assertion data structure complies with the policies of the trusted third party for communicating on the federated network; and when it is determined that either the digital certificate or the content of the identity-assertion data structure does not comply with the policies of the trusted third party for communicating on the federated network:

logging a breach of the third-party policy by transmitting a notification of breach to an audit server maintained by the trusted third party.

43. The method of claim 42, further comprising when it is determined that the digital certificate and the content of the identity-assertion data structure comply with the third-party policy:

determining, by the service-provider computing device, whether the requester is privileged to access the requested resource based on the at least one attribute; and providing access to the requested resource when it is determined that the requester is privileged.

44. The method of claim 42, further comprising transmitting an e-mail notification of the breach to an account associated with an administrator of the trusted third party.

* * * * *